(12) United States Patent
Futaki et al.

(10) Patent No.: US 11,051,233 B2
(45) Date of Patent: Jun. 29, 2021

(54) BASE STATION, RADIO TERMINAL, AND METHODS AND NON-TRANSITORY COMPUTER-READABLE MEDIA THEREFOR

(71) Applicant: NEC CORPORATION, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 23 days.

(21) Appl. No.: 16/475,764

(22) PCT Filed: Nov. 21, 2017

(86) PCT No.: PCT/JP2017/041829
§ 371 (c)(1),
(2) Date: Jul. 3, 2019

(87) PCT Pub. No.: WO2018/128020
PCT Pub. Date: Jul. 12, 2018

(65) Prior Publication Data
US 2019/0349838 A1    Nov. 14, 2019

(30) Foreign Application Priority Data

Jan. 5, 2017   (JP) .............................. JP2017-000800

(51) Int. Cl.
*H04W 48/08*   (2009.01)
*H04W 76/27*   (2018.01)
(Continued)

(52) U.S. Cl.
CPC .......... *H04W 48/08* (2013.01); *H04W 36/08* (2013.01); *H04W 76/27* (2018.02); *H04W 88/02* (2013.01); *H04W 88/08* (2013.01)

(58) Field of Classification Search
CPC ..... H04W 48/08; H04W 76/27; H04W 36/08; H04W 88/02; H04W 88/08
See application file for complete search history.

(56) References Cited

U.S. PATENT DOCUMENTS

2019/0014515 A1* 1/2019 Zee ...................... H04W 76/27
2020/0059987 A1* 2/2020 Hong .................. H04W 72/085

FOREIGN PATENT DOCUMENTS

CN     1929615 A    3/2007
EP     1786223 B1   7/2009

OTHER PUBLICATIONS

"Text Proposal to TR 38.804 on UE states and state transitions for NR", NTT DOCOMO, Inc., 3GPP TSG-RAN WG2 #96, R2-168856 Revision of R2-168089, Nov. 14-18, 2016, pp. 1-4, Reno, USA.

(Continued)

*Primary Examiner* — Ivan O Latorre
(74) *Attorney, Agent, or Firm* — Sughrue Mion, PLLC

(57) ABSTRACT

A base station (1) controls state transitions of a radio terminal (2) among first to third RRC states. In addition, the base station (1) explicitly or implicitly informs the radio terminal (2) about whether a network slice configured in the radio terminal (2) for data communication at least in the first RRC state is available in each cell included in a RAN notification area configured by a RAN (3). It is thus, for example, possible to allow a radio terminal in a first state (e.g., RRC_INACTIVE state) to be easily aware of the availability of network slices in a cell to be reselected or a reselected cell.

14 Claims, 14 Drawing Sheets

(51) Int. Cl.
*H04W 36/08* (2009.01)
*H04W 88/02* (2009.01)
*H04W 88/08* (2009.01)

(56) References Cited

OTHER PUBLICATIONS

"RAN2 impacts on slicing", Intel Corporation, 3GPP TSG RAN WG2 Meeting #96, R2-168504, Nov. 14-18, 2016, pp. 1-5, Reno, Nevada.
"Slice Availability and Discovery in RAN", Huawei, HiSilicon, 3GPP TSG-RAN WG2 Meeting #96, R2-167586, Nov. 14-18, 2016, 3 pages, Reno, Nevada.
"RAN Slicing in NR", ITRI, 3GPP TSG RAN WG2 #96, 3GPP TSG RAN WG2 #96, R2-168065, Nov. 14-18, 2015, pp. 1-4, Reno, USA.
"UE state transition diagram for NR", NTT DOCOMO, Inc., 3GPP TSG-RAN WG2 #96, R2-168077 Revision of R2-167136, Nov. 14-18, 2016, pp. 1-7, Reno, USA.
"3rd Generation Partnership Project; Technical Specification Group Services and System Aspects; Study on Architecture for Next Generation System (Release 14)", 3GPP TR 23.799 V14.0.0, Dec. 2016, pp. 1-522.
"Slice Availability and Discovery in RAN", Huawei, HiSilicon, 3GPP TSG-RAN wg2 NR Ad Hoc, R2-1700102, Jan. 17-19, 2017, 5 pages, Spokane, Washington.
International Search Report for PCT/JP2017/041829 dated Dec. 19, 2017 (PCT/ISA/210).
Huawei, "Support of Network Slice Discovery", 3GPP TSG-RAN WG3 Meeting #93bis, R3-162462, Oct. 10-14, 2016, Sophia Antipolis, France, pp. 1-4 (4 pages total).
European Search Report dated Nov. 11, 2019, from the European Patent Office in European Application No. 17890363.9.
Corrected European Search Report dated Jan. 16, 2020, from the European Patent Office in European Application No. 17890363.9.
Chinese Office Action for CN Application No. 201780087884.0 dated Feb. 3, 2021 with English Translation.

\* cited by examiner

BASE STATION, RADIO TERMINAL, AND METHODS AND NON-TRANSITORY COMPUTER-READABLE MEDIA THEREFOR

CROSS REFERENCE TO RELATED APPLICATIONS

This application is a National Stage of International Application No. PCT/JP2017/041829 filed Nov. 21, 2017, claiming priority based on Japanese Patent Application No. 2017-000800 filed Jan. 5, 2017, the disclosure of which is incorporated herein in its entirety by reference.

TECHNICAL FIELD

The present disclosure relates to a radio communication system and, in particular, to mobility of a radio terminal.

BACKGROUND ART

The 3rd Generation Partnership Project (3GPP) has started in 2016 the standardization for the fifth generation mobile communication system (5G), i.e., 3GPP Release 14, to make it a commercial reality in 2020 or later. 5G is expected to be realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

In this specification, the fifth generation mobile communication system is referred to as a 5G System or a Next Generation (NextGen) System (NG System). The new RAT for the 5G System is referred to as a New Radio (NR), a 5G RAT, or a NG RAT. A new Radio Access Network (RAN) for the 5G System is referred to as a 5G-RAN or a NextGen RAN (NG RAN). A new base station in the NG-RAN is referred to as a NR NodeB (NR NB) or a gNodeB (gNB). A new core network for the 5G System is referred to as a 5G Core Network (5G-CN) or a NextGen Core (NG Core). A radio terminal (i.e., User Equipment (UE)) capable of being connected to the 5G System is referred to as 5G UE or NextGen UE (NG UE), or simply referred to as UE. The official names of the RAT, UE, radio access network, core network, network entities (nodes), protocol layers and the like for the NG System will be determined in the future as standardization work progresses.

The term "LTE" used in this specification includes enhancement/evolution of LTE and LTE-Advanced to provide interworking with the 5G System, unless otherwise specified. The enhancement/evolution of LTE and LTE-Advanced for the interworking with the 5G System is referred to as LTE-Advanced Pro, LTE+, or enhanced LTE (eLTE). Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the 5G System, unless otherwise specified. Enhanced EPC, enhanced MME, enhanced S-GW, and enhanced P-GW are referred to, for example, as enhanced EPC (eEPC), enhanced MME (eMME), enhanced S-GW (eS-GW), and enhanced P-GW (eP-GW), respectively.

In LTE and LTE-Advanced, for achieving Quality of Service (QoS) and packet routing, a bearer per QoS class and per PDN connection is used in both a RAN (i.e., an Evolved Universal Terrestrial RAN (E-UTRAN)) and a core network (i.e., EPC). That is, in the Bearer-based QoS (or per-bearer QoS) concept, one or more Evolved Packet System (EPS) bearers are configured between a UE and a P-GW in an EPC, and a plurality of Service Data Flows (SDFs) having the same QoS class are transferred through one EPS bearer satisfying this QoS. An SDF is one or more packet flows that match an SDF template (i.e., packet filters) based on a Policy and Charging Control (PCC) rule. In order to achieve packet routing, each packet to be transferred through an EPS bearer contains information for identifying which bearer (i.e., General Packet Radio Service (GPRS) Tunneling Protocol (GTP) tunnel) the packet is associated with.

In contrast, with regard to the 5G System, it is discussed that although radio bearers may be used in the 5G-RAN, no bearers are used in the 5G-CN or in the interface between the 5G-CN and the NG-RAN (see Non-Patent Literature 1). Specifically, PDU flows are defined instead of an EPS bearer, and one or more SDFs are mapped to one or more PDU flows. A PDU flow between a 5G UE and a user-plane terminating entity in an NG Core (i.e., an entity corresponding to a P-GW in the EPC) corresponds to an EPS bearer in the EPS Bearer-based QoS concept. That is, the 5G System adopts the Flow-based QoS (or per-flow QoS) concept instead of the Bearer-based QoS concept. In the Flow-based QoS concept, QoS is handled per PDU flow. The PDU flow is also referred to as a QoS flow accordingly. Association between a 5G UE and a data network is referred to as a "PDU session". The term "PDU session" corresponds to the term "PDN connection" in LTE and LTE-Advanced. A plurality of PDU flows (or QoS flows) can be configured in one PDU session.

It has also been suggested that the 5G System supports network slicing (see Non Patent Literature 1). Network slicing uses Network Function Virtualization (NFV) and software-defined networking (SDN) techniques and makes it possible to create a plurality of virtualized logical networks on a physical network. Each virtualized logical network is referred to as a network slice or a network slice instance, includes logical nodes and functions, and is used for specific traffic and signaling. The 5G-RAN or the 5G-CN or both have a Slice Selection Function (SSF). The SSF selects one or more network slices suitable for a 5G UE based on information provided by at least one of the 5G UE and the 5G-CN.

FIG. 1 shows a basic architecture of the 5G system. A UE establishes one or more Signalling Radio Bearers (SRBs) and one or more Data Radio Bearers (DRBs) with a gNB. The 5G-CN and the gNB establish a control plane interface and a user plane interface for the UE. The control plane interface between the 5G-CN and the gNB (i.e., RAN) is referred to as an NG2 interface or an NG-c interface and is used for transfer of Non-Access Stratum (NAS) information and for transfer of control information between the 5G-CN and the gNB. The user plane interface between the 5G-CN and the gNB (i.e., RAN) is referred to as an NG3 interface or an NG-u interface and is used for transfer of packets of one or more PDU flows (or QoS flows) in a PDU session of the UE.

Furthermore, in the 5G System, a new RRC state is introduced in addition to the existing RRC_CONNECTED and RRC_IDLE states (see, for example, Non Patent Literature 1 to 5). The new RRC state is referred to as an RRC_INACTIVE state or an RRC_INACTIVE CONNECTED state.

The RRC_CONNECTED and RRC_IDLE states of the 5G system have features similar to those of the RRC_CONNECTED and RRC_IDLE states of LTE, respectively. When the UE is in the RRC_CONNECTED state, the UE and the 5G-RAN maintain an AS context, and a location of the UE is known to the 5G-RAN at cell level. Mobility of the UE in the RRC_CONNECTED state is handled by a handover controlled by the 5G-RAN. On the other hand, when the UE is in the RRC_IDLE state, the UE and the 5G-RAN have released the AS context, the location of the UE is not known to the 5G-RAN, and the location of the UE is known to the 5G-CN at location registration area level. The location registration area corresponds to a Tracking Area (TA) of LTE. Mobility of the UE in the RRC_IDLE state is handled by cell reselection controlled by the UE. Moreover, the RRC state of the AS layer is associated with a connection management (NG Connection Management (NG CM)) state of the NAS layer. The UE in the RRC_CONNECTED state is considered to be in an NG-CM-CONNECTED state in the UE and the 5G-CN. In contrast, the UE in the RRC_IDLE state is considered to be in an NG-CM-IDLE state in the UE and the 5G-CN.

It can be said that the RRC_INACTIVE state is an intermediate state between the RRC_CONNECTED state and the RRC_IDLE state. Some features of the RRC_INACTIVE state are similar to those of the RRC_CONNECTED state, while some other features of the RRC_INACTIVE state are similar to those of the RRC_IDLE state.

When the UE is in the RRC_INACTIVE state, the UE and the 5G-RAN maintain at least part of the AS context. The AS context held by the UE and the 5G-RAN for the UE in the RRC_INACTIVE state includes, for example, a radio bearer configuration and an AS security context. Further, the 5G-RAN keeps the control-plane and user-plane connections (i.e., NG2 and NG3 interfaces in FIG. 1) with the 5G-CN for the UE in the RRC_INACTIVE state established. The UE in the RRC_INACTIVE state is considered to be in the NG-CM-CONNECTED state in the UE and the 5G-CN. Accordingly, the 5G-CN does not distinguish whether the UE is in the RRC_CONNECTED state or the RRC_INACTIVE state. These features of the RRC_INACTIVE state are similar to those of the RRC_CONNECTED state.

However, the mobility of the UE in the RRC_INACTIVE state is similar to that of the UE in the RRC_IDLE state. Specifically, the mobility of the UE in the RRC_INACTIVE state is handled by the cell reselection controlled by the UE.

FIG. 2 shows state transitions, which are currently proposed, between the three RRC states. The UE can transition from the RRC_CONNECTED state to the RRC_INACTIVE state and vice versa (Steps 201 and 202). It is assumed that the transition between the RRC_CONNECTED state and the RRC_INACTIVE state reuses the Suspend and Resume procedures of the RRC Connection defined for LTE in 3GPP Release 13. The AS context stored in the 5G-RAN for the UE in the RRC_INACTIVE state may be transferred between RAN nodes (i.e., gNBs). Specifically, when the UE transitions from the RRC_INACTIVE state to the RRC_CONNECTED state, the gNB which has received an RRC message (e.g., RRC Connection Resume request) from the UE may fetch or retrieve the AS context of this UE from another gNB.

The location of the UE in the RRC_INACTIVE state is known to the 5G-RAN at a level of a newly defined RAN Notification Area (RNA). The RAN notification area is also referred to as a RAN-based Notification Area, a RAN paging area, or a RAN location update area. The RAN notification area (RNA) includes one or more cells, is determined by the 5G-RAN, and is configured in the UE by the 5G-RAN. Even when the UE in the RRC_INACTIVE state moves between cells by cell reselection within the RAN notification area, there is no need to notify (or report to) the 5G-RAN that it has performed the cell reselection. The UE in the RRC_INACTIVE state requests the 5G-RAN to update the RAN notification area in response to reselecting a cell outside the RAN notification area.

FIG. 3 shows an example of the mobility of the UE in the RRC_INACTIVE state. First, a UE 301 is in the RRC_CONNECTED state (321) in a cell 351 of a gNB 311 and it has been assigned dedicated radio resources from the gNB 311 and has established dedicated radio bearers 322. Upon determining to move the UE 301 into the RRC_INACTIVE state, the gNB 311 configures the UE 301 with a RAN notification area 340 and transmits an RRC message (e.g., RRC Suspend message) to the UE 301 (323). In response to the instruction from the gNB 311, the UE 301 enters the RRC_INACTIVE state from the RRC_CONNECTED state (324).

The UE 301 in the RRC_INACTIVE state performs a cell reselection procedure and accordingly reselects a cell 352 of a gNB 312 (325). Since the cell 352 is included in the RAN notification area 340 configured in the UE 301, the UE 301 does not report the cell reselection (i.e., update of UE location information) to the 5G-RAN (e.g., cell 352 or gNB 312). The UE 301 further moves and reselects a cell 353 of a gNB 313 (326). The cell 353 is not included in the RAN notification area 340 configured in the UE 301, and accordingly the UE 301 transmits a request for a RAN notification area update (327) to the gNB 313. The request (327) may be transmitted using an RRC message (e.g., RRC Resume Request message) requesting a transition from RRC_INACTIVE to RRC_CONNECTED. The gNB 313 acquires an AS context of the UE 301 from the gNB 311 and re-establishes the Packet Data Convergence Protocol (PDCP) and Radio Link Control (RLC) for radio bearers using the acquired AS context. Then, the gNB 313 transmits an RRC message (e.g., RRC resume message) to move the UE 301 to the RRC_CONNECTED state. In response to the instruction from the gNB 311, the UE 301 enters the RRC_CONNECTED state from the RRC_INACTIVE state in the cell 353 (329). The UE 301 is able to transmit and receive data using dedicated radio bearers 330.

CITATION LIST

Non Patent Literature

[Non-Patent Literature 1] 3GPP TR 23.799 V14.0.0 (2016-12) "3rd Generation Partnership Project; Technical Specification Group Services and System Aspects; Study on Architecture for Next Generation System (Release 14)", December 2016

SUMMARY OF INVENTION

Technical Problem

The present inventor has conducted studies on mobility of a UE in the RRC_INACTIVE state and found some problems. For example, the mobility of the UE in the RRC_I-NACTIVE state may require considerations over network slices. This is because a desired network slice might not be available in a reselected cell in some cases. The network slice desired by the UE is, for example, a network slice that had been selected (or configured) by the network for this UE when the UE was in the RRC_CONNECTED state before it has entered the RRC_INACTIVE state.

In an example shown in FIG. 4, a 5G-CN 430 includes Common Network Functions (NFs) 431, Network Functions for Network Slice A (NFs for slice A) 432, and Network Functions for Network Slice B (NFs for slice B) 433. The Common NFs 431 include a Common Control plane Network Function (CCNF) and may further include a Common User plane Network Function (CUNF). The NFs for slice A432 include a Slice-specific User-plane Network Function (SUNF) and may further include Slice-specific Control-plane NF (SCNF). Likewise, the NFs for slice B433 includes an SUNF and may further include an SCNF.

In the example of FIG. 4, gNBs 411 and 412 are both connected to the Common NFs 431, the NFs for slice A432, and the NFs for slice B433. Meanwhile, a gNB 413 is connected to the Common NFs 431 and the NFs for slice A432, but it is not connected to the NFs for slice B433. That is, the network slice B is not available in a cell 423 of the gNB 413.

In the example of FIG. 4, first, a UE 401 is in the RRC_CONNECTED state in a cell 421 of the gNB 411 and has been configured with the network slice B. The UE 401 thus transmits and receives data through the network slice B. After that, the UE 401 is configured with a RAN notification area 440 by the gNB 411 and enters the RRC_INACTIVE state. Furthermore, the UE 401 performs cell reselection (452). However, one problem is that how the UE 401 in the RRC_INACTIVE state can know whether a desired network slice is available in a target cell (i.e., a cell to be reselected or a reselected cell).

As an example, it may be preferable that the UE in the RRC_INACTIVE state be able to determine whether the desired network slice is available in the reselected cell. If the UE can be aware that the desired network slice is available in the reselected cell, the UE in the RRC_INACTIVE state can be allowed to remain the RRC_INACTIVE state in the reselected cell without performing any special operation. On the other hand, if it is unknown whether the desired network slice is available in the reselected cell, the UE can immediately enter the RRC_CONNECTED state in the reselected cell and request the network for the use of the network slice. Alternatively, if the UE in the RRC_INACTIVE state can know that the desired network slice is unavailable in the cell to be reselected or in the reselected cell, the UE can further reselect another cell.

Accordingly, one of the objects to be attained by embodiments disclosed herein is to provide an apparatus, a method, and a program that allow a UE in RRC_INACTIVE state to be easily aware of the availability of network slices in a target cell, i.e., a cell to be reselected or a reselected cell. It should be noted that this object is merely one of the objects to be attained by the embodiments disclosed herein. Other objects or problems and novel features will be made apparent from the following description and the accompanying drawings.

Solution to Problem

In a first aspect, a base station includes a memory and at least one processor couple to the memory. The at least one processor is configured to control state transitions of a first radio terminal among first to third RRC states. The first RRC state is a state in which the first radio terminal and the RAN maintain an access stratum (AS) context and in which a location of the first radio terminal is known to the RAN at cell level. The second RRC state is a state in which the first radio terminal and the RAN maintain at least part of the AS context and in which the location of the first radio terminal is known to the RAN at RAN notification area level configured by the RAN. The third RRC state is a state in which the first radio terminal and the RAN have released the AS context and in which the location of the first radio terminal is not known to the RAN. The at least one processor is further configured to explicitly or implicitly inform the first radio terminal about whether a first network slice configured in the first radio terminal for data communication at least in the first RRC state is available in each cell included in the RAN notification area.

In a second aspect, a base station includes a memory and at least one processor couple to the memory. The at least one processor is configured to control state transitions of a first radio terminal among first to third RRC states. The at least one processor is further configured to transmit, in a first cell of the base station, system information indicating one or more network slices available or unavailable in the first cell.

In a third aspect, a radio terminal includes a transceiver and at least one processor. The at least one processor is configured to control the transceiver in one or more cells associated with a radio access network (RAN). The at least one processor is configured to control state transitions of the radio terminal among first to third RRC states. The at least one processor is further configured to check whether a first network slice configured in the radio terminal for data communication at least in the first RRC state is available in a cell to be reselected by cell reselection in the second RRC state.

In a fourth aspect, a method for a base station placed in a Radio Access Network (RAN) includes: (a) controlling state transitions of a first radio terminal among first to third RRC states; and (b) explicitly or implicitly informing the first radio terminal about whether a first network slice configured in the first radio terminal for data communication at least in the first RRC state is available in each cell included in a RAN notification area configured by the RAN.

In a fifth aspect, a method for a base station placed in a Radio Access Network (RAN) includes: (a) controlling state transitions of a radio terminal among first to third RRC states; and (b) transmitting, in a first cell of the base station, system information indicating one or more network slices available or unavailable in the first cell.

In a sixth aspect, a method for a radio terminal includes: (a) controlling state transitions of the radio terminal among first to third RRC states; and (b) checking whether a first network slice configured in the radio terminal for data communication at least in the first RRC state is available in a cell to be reselected by cell reselection in the second RRC state.

In a seventh aspect, a program includes instructions (software codes) that, when loaded into a computer, cause the computer to perform the method according to one of the above-described fourth to sixth aspects.

Advantageous Effects of Invention

According to the above-deceived aspects, it is possible to provide an apparatus, a method, and a program that allow a UE in RRC_INACTIVE state to be easily aware of the availability of network slices in a target cell, i.e., a cell to be reselected or a reselected cell.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on a 5G system that supports network slicing and uses an RRC_INACTIVE state. However, these embodiments may be applied to other radio communication systems supporting network slicing and using an RRC_INACTIVE state or a similar RRC state.

First Embodiment

Figure 1:
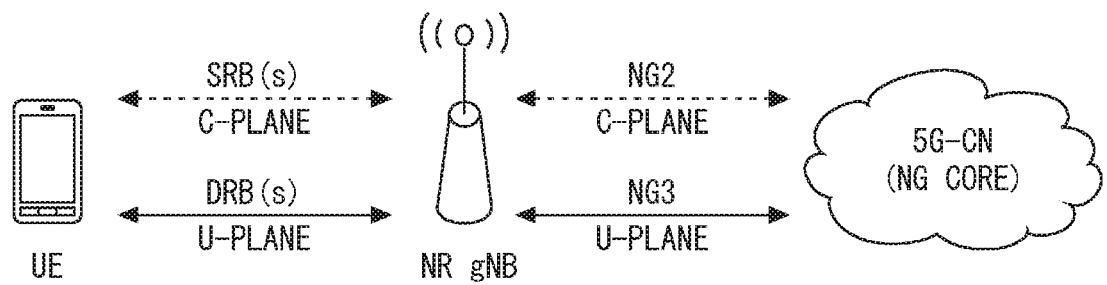
FIG. 1 is a diagram showing basic architecture of the 5G System according to the Background Art.
Figure 2:
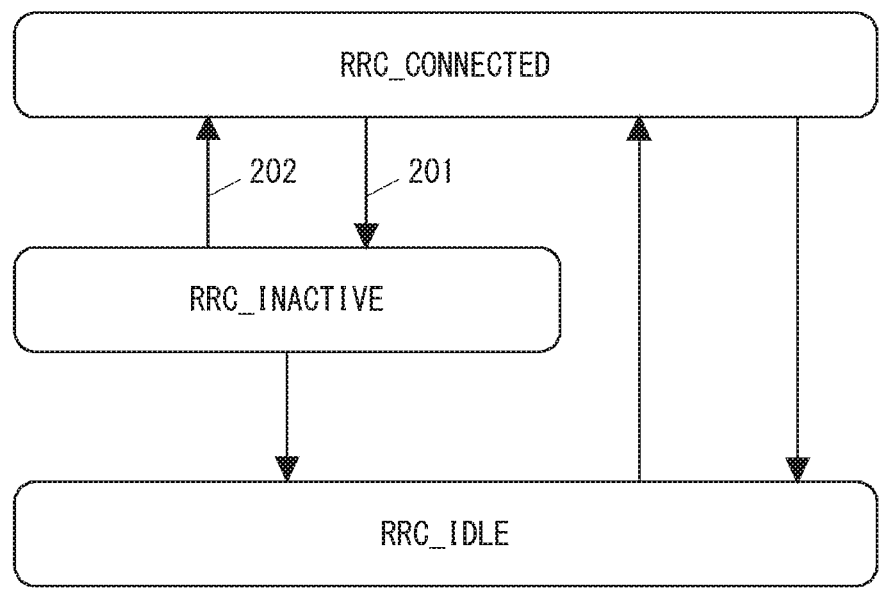
FIG. 2 is a diagram showing state transition among the three RRC states in the 5G system according to the Background Art.
Figure 3:
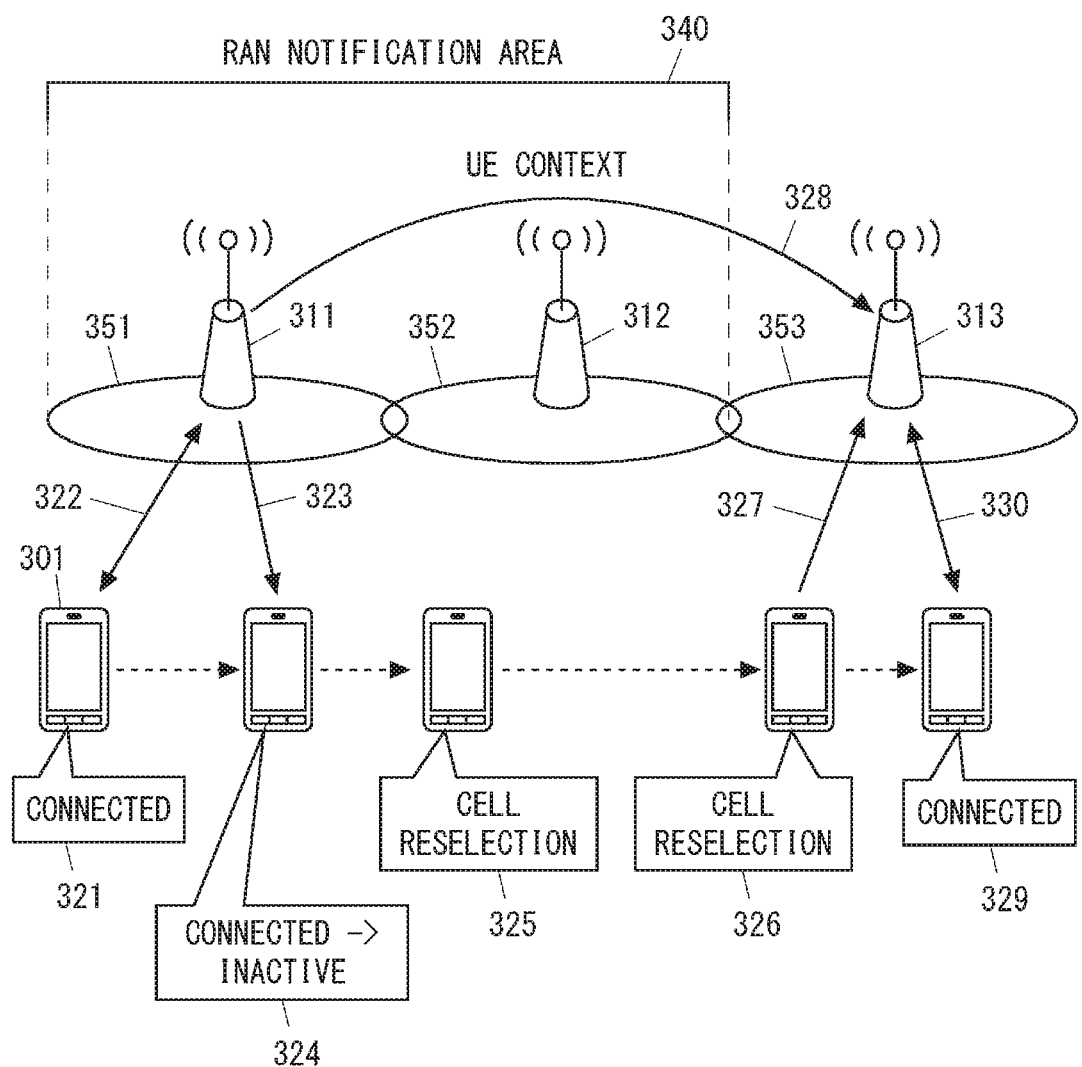
FIG. 3 is a diagram showing one example of mobility of a UE in RRC_INACTIVE state according to the Background Art.
Figure 4:
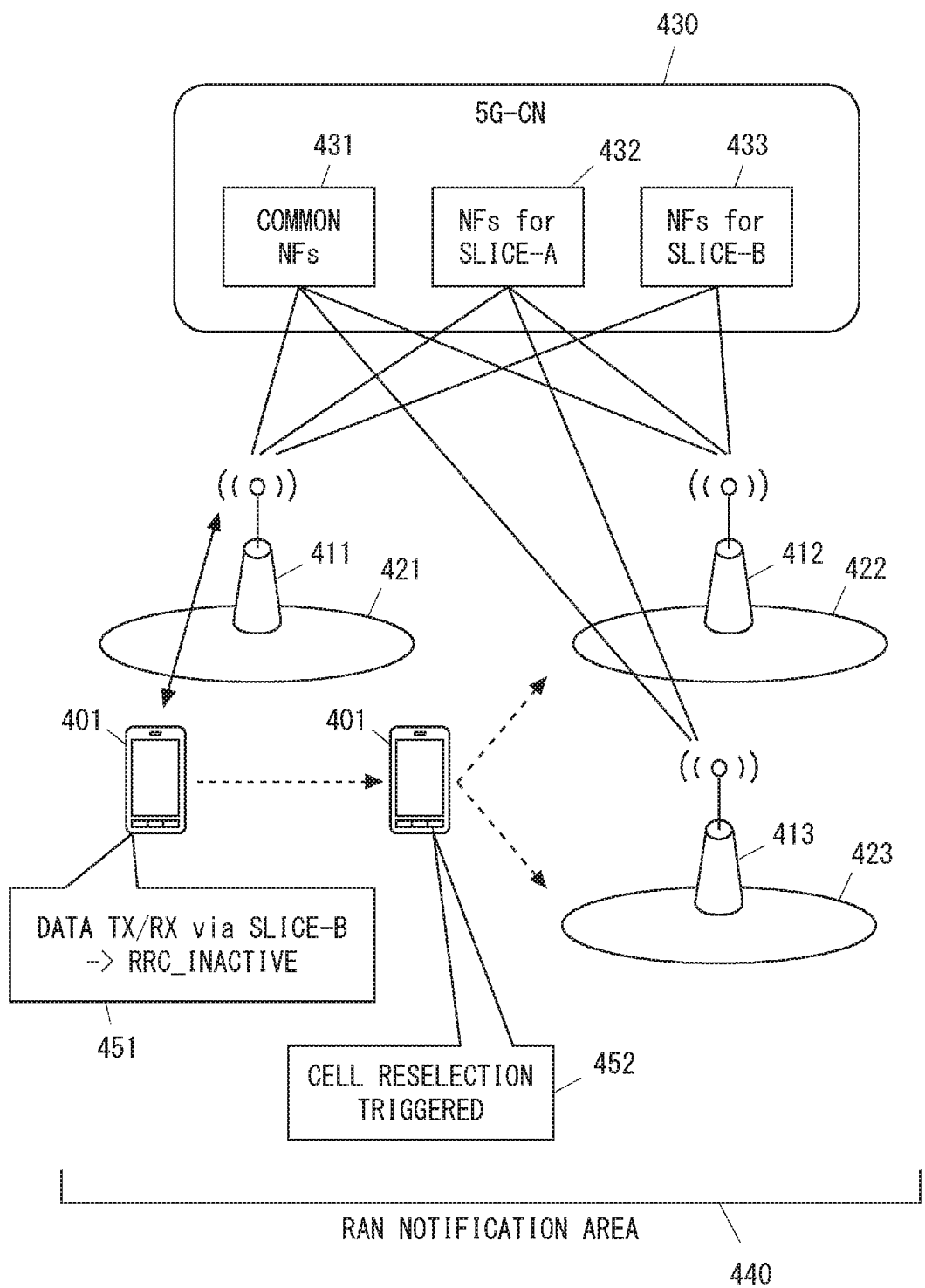
FIG. 4 is a diagram for explaining a problem identified by the inventors regarding the mobility of a UE in RRC_INACTIVE state.
Figure 5:
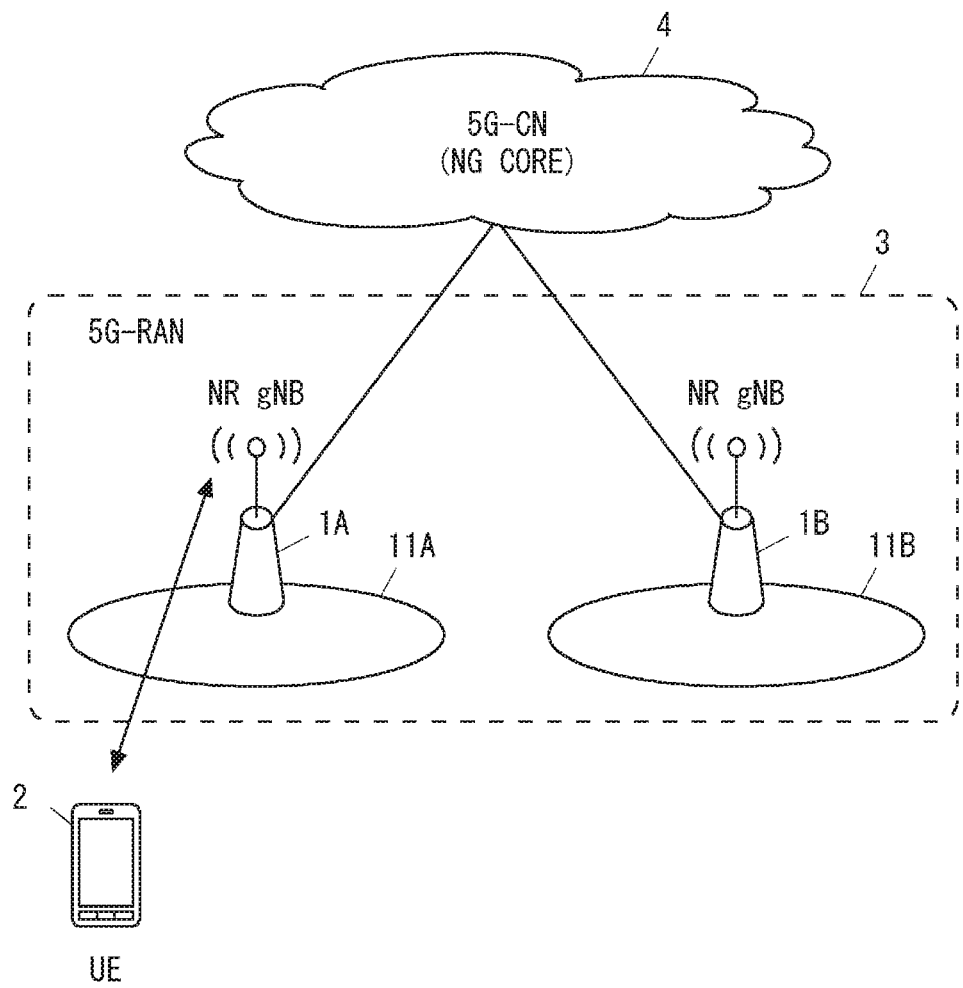
FIG. 5 is a diagram showing a configuration example of a radio communication network according to a plurality of embodiments.

FIG. 5 shows a configuration example of a radio communication network according to a plurality of embodiments including this embodiment. In the example of FIG. 5, the radio communication network includes a 5G UE 2, a 5G-RAN 3, and a 5G-CN 4.

The 5G-CN 4 includes Control Plane Network Functions (CP NFs) and User Plane Network Functions (UP NFs), which are not shown, and provides a plurality of network slices. The network slices are distinguished from one another according to, for example, services or use cases provided to UEs on each of the network slices. The use cases include, for example, enhanced Mobile Broad Band (eMBB), Ultra Reliable and Low Latency Communication (URLLC), and massive Machine Type Communication (mMTC).

The 5G-RAN 3 includes a plurality of gNBs, including a gNB 1A and a gNB 1B. Each gNB 1 (e.g., gNB 1A and gNB 1B) serves at least one cell 11 (e.g., cell 11A and cell 11B). Each gNB 1 is connected to the 5G-CN 4 and supports one or more network slices. In other words, one or more network slices are supported or available in the cell 11 of each gNB 1. In some implementations, in order to provide end-to-end network slicing to the UE 2, the 5G-RAN 3 assigns, to the UE 2, a RAN slice and a radio slice associated with a network slice of the 5G-CN 4 (referred to as a Core Network (CN) slice) selected for the UE 2. Each RAN slice provides storage and processing resources of the infrastructures within the 5G-RAN 3 including the gNB 1. Each radio slice provides radio resources including time resources, frequency resources, code resources, signal sequence resources, or spatial resources, or any combination thereof.

The UE 2 uses one or more cells 11 served by one or more gNBs 1 for uplink and downlink communication. The UE 2 supports a plurality of RRC states including the RRC_CONNECTED state, the RRC_INACTIVE state, and the RRC_IDLE state. The 5G-RAN 3 (gNB 1) and the UE 2 control state transitions of the UE 2 among the RRC states including the RRC_CONNECTED, RRC_INACTIVE, and RRC_IDLE states.

For example, when the gNB 1A moves the UE 2 from the RRC_CONNECTED state to the RRC_INACTIVE state, it transmits, to the UE 2, RAN notification area information via an RRC message (e.g., RRC Connection Release, RRC Connection Suspend, or RRC Connection Deactivate) to configure the RAN notification area in the UE 2. The RAN notification area includes one or more cells served by one or more gNBs 1. The UE 2 enters the RRC_INACTIVE state in response to receiving the RRC message from the gNB 1A. The UE 2 in the RRC_INACTIVE state moves between cells by cell reselection controlled by the UE 2, and does not need to report the cell reselection (i.e., update of UE location information) within the RAN notification area to the 5G-RAN 3. In contrast, in response to reselecting a cell (e.g., cell 11B) outside the configured RAN notification area, the UE 2 requests the gNB 1B serving the reselected cell 11B to update the RAN notification area (or notify the gNB 1B that it has left the configured RAN notification area). The gNB 1B determines a new RAN notification area for the UE 2, and configures the determined RAN notification area in the UE 2. That is, as described above, the location of the UE 2 in the RRC_INACTIVE state is known to the 5G-RAN 3 at RAN notification area level.

As already described, the RAN notification area (RNA) includes one or more cells, is determined by the 5G-RAN 3, and is configured in the UE 2 by the 5G-RAN 3. The RAN notification area is also referred to as a RAN-based Notification Area, a RAN paging area, or a RAN location update area.

The RAN notification area information may include at least, for example, information indicating which cells are included in the RAN notification area. In addition, the RAN notification area may be assigned an identifier (e.g., area number). Furthermore, the relationship between an identifier of the RAN notification area (e.g., RNA ID) and the cell(s) contained therein may be determined uniquely within a predetermined area. In this case, the RAN notification area information may include an identifier of the RAN notification area and information regarding the contained cell(s) (e.g., cell identifier(s)).

The gNB 1A may broadcast the RAN notification area information in its cell 11A. At this time, the RAN notification area information may include information relating to a plurality of RAN notification areas, they may be assigned their respective conditions (e.g., category, type), and the UE 2 may select one RAN notification area suitable for the UE 2. The condition is, for example, a slice category or slice type (e.g., Slice/Service Type (SST)) of a network slice used (or desired) by the UE 2, a terminal category or terminal type, reception quality at the UE 2 or a coverage level based thereon, mobility characteristics of the UE 2 (e.g., UE speed, whether it is a stationary terminal), or any combination thereof.

The RAN notification area configured in the UE 2 may be the same as the location registration area of the UE 2 (i.e., area corresponding to the Tracking Area (TA) in LTE). When each individual RAN notification area (i.e., Slice specific RNA) is configured for each network slice, at least one of the RAN notification areas may be the same as the location registration area (e.g., TA). When the RNA is the same as the TA, an information element (e.g., RanAreaCell-List Information Element (IE)) indicating a cell list included in this RNA may be omitted from the RAN notification area information transmitted from the gNB 1 to the UE 2 (that is, an Optional IE). Alternatively, the RAN notification area information may include an information element (e.g., TrackingAreaCode IE) indicating a TA identifier instead of the information element indicating the cell list (that is, Choice). In other words, the gNB 1 may select one of the RanAreaCellList IE and the TrackingAreaCode IE to indicate the RAN notification area.

In order to transmit the RAN notification area information including information relating to the plurality of RAN notification areas, the gNB 1A may receive RAN notification area information (e.g., combination of the identifier of a RAN notification area and the identifiers of cells constituting this RAN notification area) from another gNB (e.g., gNB 1B) through an inter-gNB interface (Xn). The other gNB may manage a cell belonging to another RAN notification area different from that to which the cell (e.g., cell 11A) of the gNB 1A belongs. Likewise, the RAN notification area-related information received from the other gNB may relate to another RAN notification area different from that to which the cell (e.g., cell 11A) of the gNB 1A belongs.

When the UE 2 uses (or desires) a plurality of network slices, it may select one RAN notification area based on the network slice having the highest priority or based on the network slice that is actually being used. Alternatively, the UE 2 may select one RAN notification area based on the network slice that is high on the list of network slice categories or types contained in the RAN notification area information.

The above-described RAN notification area information may include a RAN notification area (e.g., default RAN notification area) whose individual information (e.g., identifier, category, or type) is not explicitly specified. In this case, for example, the default RAN notification area may be used for the UE 2 regardless of the network slice, or may be used for network slices other than those explicitly indicated in the RAN notification area information. Furthermore, when the RAN notification area information includes a plurality of RAN notification areas, the UE 2 may not need to transmit to the gNB 1 a request for updating its location information as long as the cell after the cell reselection is included in at least one of the RAN notification areas.

Instead of the above-described instruction via the RRC message, the gNB 1 may notify the UE 2 about a value of a predetermined timer which triggers the transition to the RRC_INACTIVE state, to cause the UE 2 to execute the transition to the RRC_INACTIVE state based on the timer value and the corresponding timer. For example, the UE 2 in the RRC_CONNECTED state may restart the timer (i.e., reset the timer and start it again) each time it transmits or receives user data, and may transition to the RRC_INACTIVE state when the timer expires.

The following describes the mobility of the UE 2 in the RRC_INACTIVE state according to this embodiment. The gNB 1 according to this embodiment is configured to explicitly inform the UE 2 about whether one or more network slices configured in (or selected for) the UE 2 for data communication at least in the RRC_CONNECTED state are available in each cell included in the RAN notification area for the UE 2. More specifically, in this embodiment, the gNB 1 is configured to transmit, to the UE 2, information explicitly indicating whether one or more network slices configured in the UE 2 are available in each cell or each group of cells included in the RAN notification area, which is hereinafter referred to as "slice availability information". Instead of the slice availability information, the gNB 1 may transmit, to the UE 2, information explicitly indicating whether the slices are supported, which is hereinafter referred to as "slice support information". The slice availability information or the slice support information may indicate one or more kinds (e.g., categories, types) of network slices available (or supported) in the RAN notification area or in one or more cells included in the RAN notification area. Hereinafter, although the slice availability information is described as an example, the slice support information may be used instead.

In some implementations, the gNB 1 may transmit the slice availability information to the UE 2 when configuring the RAN notification area in the UE 2. The slice availability information may be one information element associated with the RAN notification area (e.g., a list of cells). Additionally or alternatively, the gNB 1 may transmit the slice availability information to the UE 2 during a procedure (e.g., an RRC message) in which the gNB 1 moves the UE 2 from the RRC_CONNECTED state to the RRC_INACTIVE state.

Figure 6:
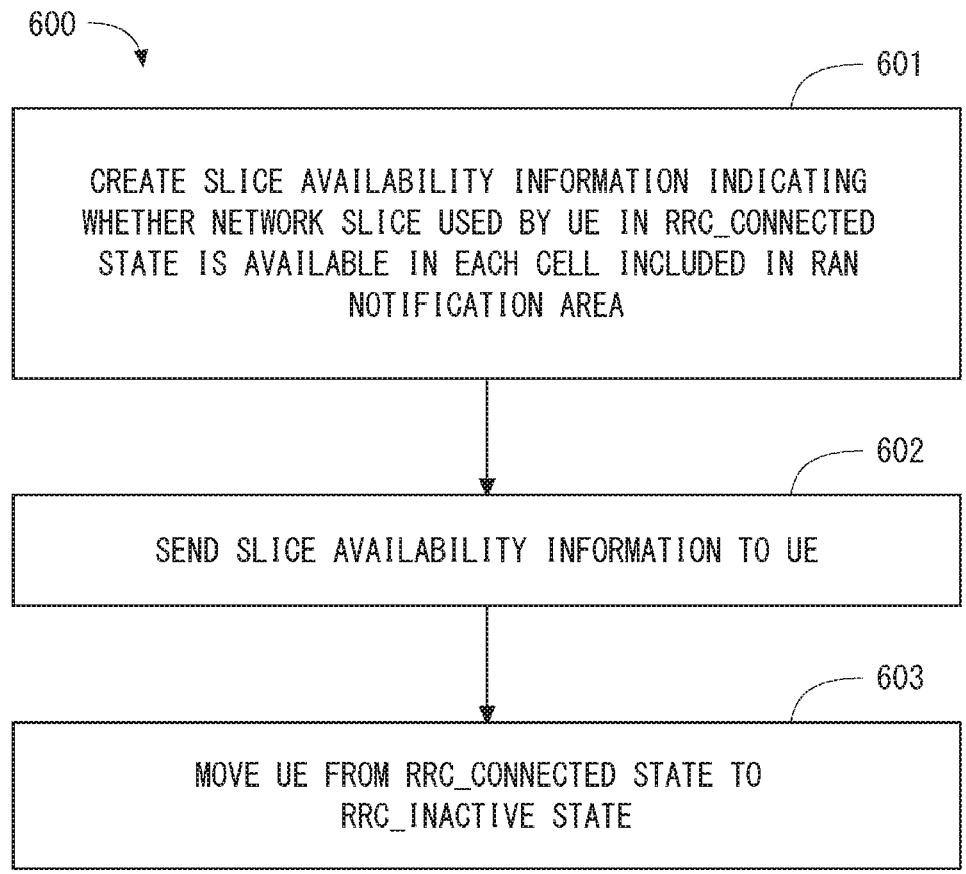
FIG. 6 is a sequence diagram showing an example of information exchange between gNBs according to a first embodiment.

FIG. 6 is a flowchart showing a process 600 that is an example of the operation of the gNB 1. In Step 601, the gNB 1 creates slice availability information indicating whether the network slice used by the UE 2 in the RRC_CONNECTED state is available in each cell included in the RAN notification area. In Step 602, the gNB 1 transmits the slice availability information to the UE 2. The gNB 1 may transmit the slice availability information together with the RAN notification area (e.g., a list of cells). In Step 603, the gNB 1 moves the UE 2 from the RRC_CONNECTED state to the RRC_INACTIVE state. As described above, the gNB 1 may transmit an instruction to move the UE 2 to the RRC_INACTIVE state, together with the slice availability information.

Each gNB 1 needs to know the slice availability (or slice support status) in other gNBs 1 or in each of the cells served by the other gNBs 1. In some implementations, a network operator may configure, in each gNB 1, the slice availability in the cells of the other gNBs 1 via an Operation and Management (O&M) server. Additionally or alternatively, each gNB 1 may communicate with another gNB 1 over the inter-gNB interface (Xn) (e.g., Xn Setup Request/Response messages), thereby dynamically acquiring the slice availability in the cells of the other gNB 1. When its slice availability has been changed (or updated), each gNB 1 may notify other gNBs 1 of it (e.g., gNB Configuration Update message). Additionally or alternatively, each gNB 1 may communicate with another gNB 1 through the interface (NG2, NG-c) between the gNB 1 and the 5G-CN 4, and dynamically acquire the slice availability in the cells of the other gNB 1.

Figure 7:
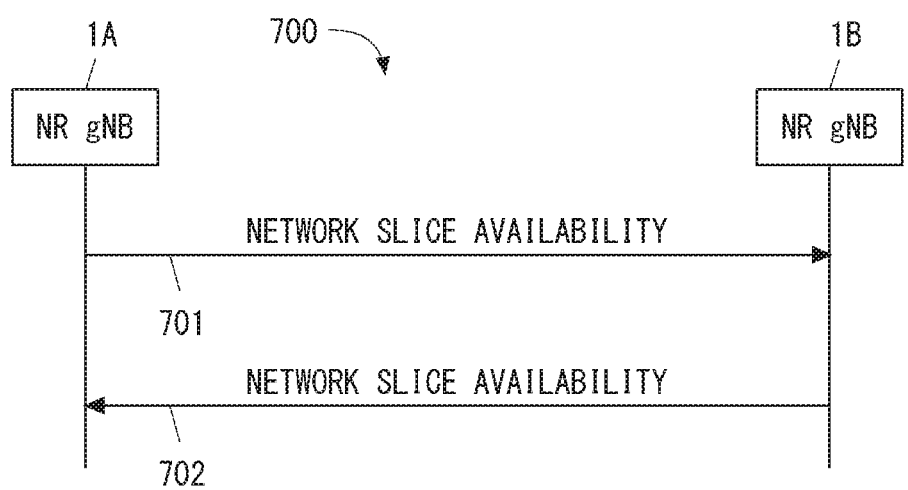
FIG. 7 is a flowchart showing an example of an operation of a gNB according to the first embodiment.

FIG. 7 is a sequence diagram showing a process 700 that is an example of communication between two gNBs 1.

In Step 701, the gNB 1A sends, to the gNB 1B, information (e.g., Network Slice Availability Information) indicating network slices available in each cell served by the gNB 1A. The gNB 1A may send this information in response to a request from the gNB 1B. Additionally or alternatively, in response to an update of the slice availability in any of the cells served by the gNB 1A, the gNB 1A may send the update to the gNB 1B. Additionally or alternatively, the gNB 1A may periodically send the slice availability in each cell to the gNB 1B. In Step 702, the gNB 1B sends, to the gNB 1A, information (e.g., Network Slice Availability Information) indicating network slices available in each cell served by the gNB 1B. Additionally or alternatively, the gNB 1A may send to the gNB 1B, through the interface (NG2, NG-c) with the core network (5G-CN 4), the information (e.g., Network Slice Availability Information) indicating network slices available in each cell served by the gNB 1A.

Note that, as described above, the gNB 1A may exchange their RAN notification area information (e.g., combination of the identifier of the RAN notification area and the identifiers of the cells constituting the RAN notification area) with the gNB 1B through an inter-gNB interface (Xn). In this case, the RAN notification area information may indicate a RAN notification area to which the cell 11 of the transmission source gNB 1 belongs, or instead indicate a RAN notification area to which the cell 11 of the transmission destination gNB 1 should belong. That is, when the cells 11A and 11B managed by the gNB 1A and the gNB 1B, respectively, belong to (or should belong to) different RAN notification areas, the gNBs 1 may share the RAN notification area information with each other and recognize the plurality of RAN notification areas which should be included in the RAN notification area information to be transmitted to the UE 2.

The RAN notification area information communicated between the gNBs may be included in the information (e.g., Network Slice Availability Information) indicating network slices available in each cell served by the gNB 1A shown in FIG. 7. On the other hand, the RAN notification area information communicated between the gNBs may include the information (e.g., Network Slice Availability Information) indicating network slices available in each cell served by the gNB 1A shown in FIG. 7.

In some implementations, the information indicating network slices available in each cell served by the gNB 1A and the corresponding information regarding the gNB 1B may be sent from the core network (5G-CN 4) to the gNB 1B and the gNB 1A, respectively. In this case, the 5G-CN needs to know in advance network slices available (or supported) in each gNB 1. For example, the 5G-CN 4 may specify, for each gNB 1, network slices available (or supported) in each gNB 1. Alternatively, the 5G-CN 4 may receive from each gNB 1 a report of network slices available (or supported) in the gNB 1.

The UE 2 according to this embodiment is configured to check whether one or more network slices that have been configured in (or allowed (authorized) or accepted for) the UE 2 for data communication at least in the RRC_CONNECTED state are available in a cell to be reselected (or a reselected cell) by cell reselection in the RRC_INACTIVE state. More specifically, in this embodiment, the UE 2 is configured to receive the above-described slice availability information from the gNB 1. The slice availability information explicitly indicates whether one or more network slices configured in the UE 2 are available in each cell included in the RAN notification area for the UE 2.

Figure 8:
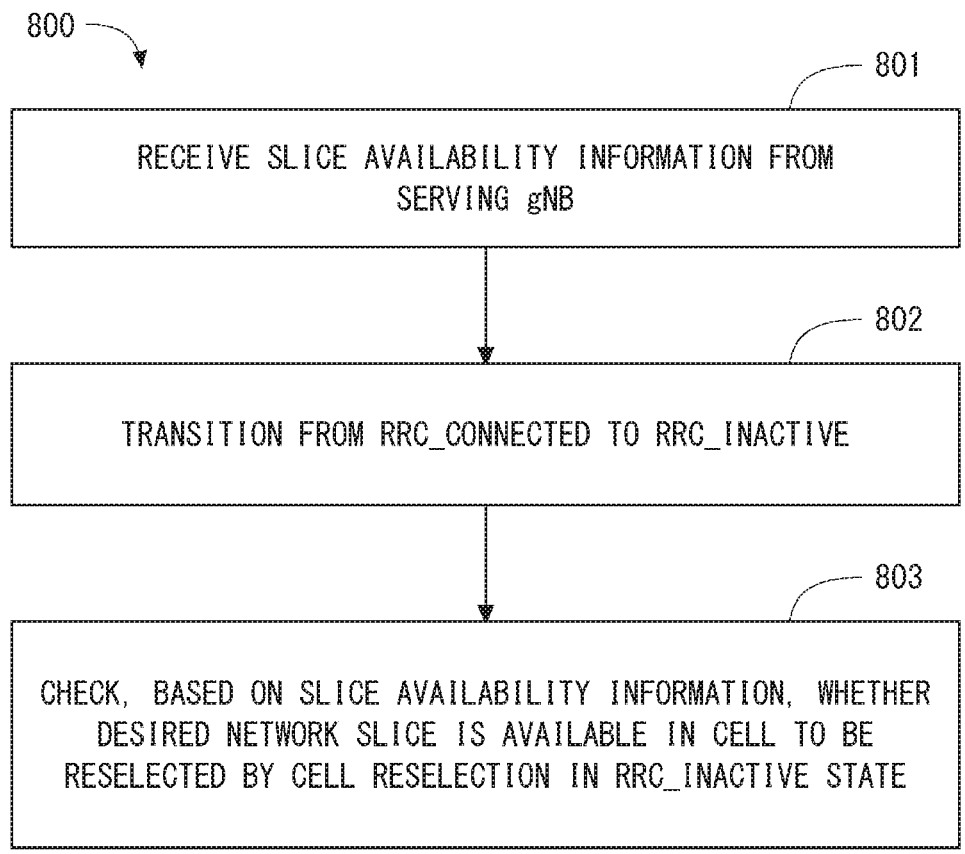
FIG. 8 is a flowchart showing an example of an operation of a UE according to the first embodiment.

FIG. 8 is a flowchart showing a process 800 that is an example of the operation of the UE 2. In Step 801, the UE 2 is in the RRC_CONNECTED state and receives the above-described slice availability information from the serving gNB 1. In Step 802, the UE 2 transitions from the RRC_CONNECTED state to the RRC_INACTIVE state in response to an instruction from the serving gNB 1. In Step 803, the UE 2 in the RRC_INACTIVE state performs cell reselection. The UE 2 checks, based on the slice availability information, whether a desired network slice(s) is available in the cell to be reselected (or in the reselected cell). The desired network slice(s) may be one or more network slices that had been configured in (or allowed (authorized) or accepted for) the UE 2 by the network (i.e., 5G-CN 4 or 5G-RAN 3 or both) when the UE 2 was formerly in the RRC_CONNECTED state.

Figure 9:
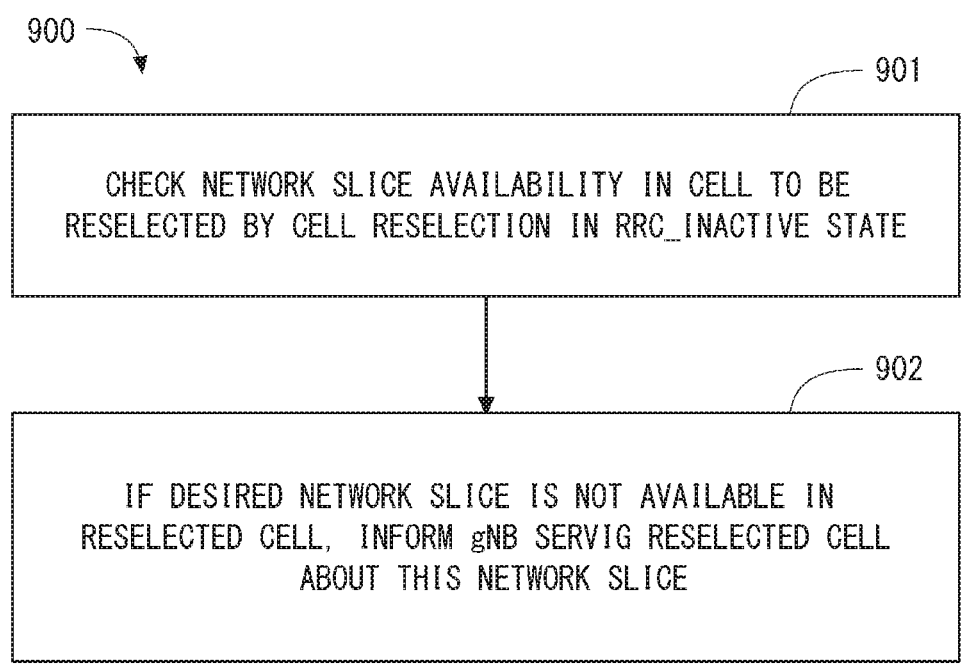
FIG. 9 is a flowchart showing an example of an operation of a UE according to the first embodiment.

The following describes an example of the operation of the UE 2 after checking the network slice availability. FIG. 9 is a flowchart showing a process 900 that is an example of the operation of the UE 2. In Step 901, the UE 2 checks the network slice availability in the cell to be reselected (or the reselected cell) by cell reselection in the RRC_INACTIVE state. If the desired network slice is available in the reselected cell, the UE 2 stays in that cell (continue to camp on that cell).

If the desired network slice is not available in the reselected cell, the UE 2 performs a notification to the gNB 1 serving the reselected cell about the desired network slice (Step 902). The notification may be a request for the desired network slice, for example, a request for configuring the desired network slice with the UE 2 (or providing the desired network slice to the UE 2) or a request for moving (e.g., handover, re-direction) to a cell where the desired network is available (or supported). When the UE 2 fails to confirm that the desired network slice is available in the reselected cell, it may inform the gNB 1 serving the reselected cell about the desired network slice. In other words, when it is unknown whether the desired network slice is available in the reselected cell, the UE 2 may inform the gNB 1 serving the reselected cell about the desired network slice.

In some implementations, the UE 2 may transmit a notification about the desired network slice after transitioning to the RRC_CONNECTED state. Alternatively, the UE 2 may transmit a notification about the desired network slice while it is in the RRC_INACTIVE state. In other words, the UE 2 may transmit the notification without completely transitioning to the RRC_CONNECTED state. Furthermore, in other words, the UE 2 may transmit the notification before entering the RRC_CONNECTED state. In one example, the UE 2 may transmit the notification during a procedure for transitioning to the RRC_CONNECTED state. Specifically, the UE 2 may transmit the notification using an RRC message (e.g., RRC Connection Resume request or RRC Connection Activate) used for the transition to the RRC_CONNECTED state. Alternatively, the UE 2 may transmit the notification about the desired network slice using a signal that can be transmitted while remaining in the RRC_INACTIVE state (e.g., PRACH preamble, RACH data, UL reference signal, MAC Control Element (CE)), or an RRC message (e.g., UL Information Transfer, UL Direct Information, or UE Assistance Information)). At this time, the signal or message may be transmitted using a dedicated radio resource that the UE 2 has notified of (or configured with) in advance, or using a radio resource shared among a plurality of UEs 2. In the latter case, for example, the UE 2 may transmit the notification about the desired network slice in a transmission scheme in which a separate grant for uplink transmission is not required (i.e., grant-free). The RRC message may be transmitted, for example, in the first step uplink transmission (e.g., RACH data) in a new random access procedure for NR. The new random access procedure for NR may be a procedure which is a Contention-based Random Access procedure including a total of two steps, which has been simplified from that in LTE including a total of four steps. The UE 2 may be configured in advance by the gNB 1 with either the two-step random access or the four-step random access. Alternatively, the UE 2 may perform one of the random access procedures that is allowed (or supported) in the cell after the cell reselection. The UE 2 may determine whether the two-step random access or the four-step random access is allowed (or supported) according to whether configuration information regarding radio resources used therefor is transmitted in system information.

The notification about the desired network slice may be, for example, the UE 2 explicitly transmitting identification information (e.g., a unique identifier or temporary identifier of the network slice, a slice category of the network slice, or a slice type (e.g., Slice/Service Type (SST))) of the desired network slice. The identification information regarding the desired network slice may be transmitted, for example, via Network Slice Selection Assistance Information (NSSAI) contained in an RRC message or MAC Control Element. Additionally or alternatively, the identification information regarding the desired network slice may be implicitly transmitted using a predetermined signal sequence (e.g., RACH preamble, UL reference signal) previously associated therewith, or a predetermined time, frequency, code, or space radio resources previously associated therewith. The gNB 1 may broadcast, in its cell, information regarding association between the identification information regarding the desired network slice and the signal sequence or radio resource, or may individually notify the UE 2 of it. When the gNB 1 broadcasts the information regarding the association, the UE 2 may receive (or monitor) it in a reselected target cell after reselection. Furthermore, when a plurality of network nodes (e.g., Network Slice Instance (NSI)) support (or provide) the same slice type, the gNB 1 or the 5G-CN may configure, in the UE 2, identifiers (e.g., Slice Differentiators (SDs)) for distinguishing these network nodes in the UE 2. In this case, the UE 2 may also explicitly or implicitly transmit this identifier via the notification about the desired network slice.

After receiving the RRC message including the notification or the signal indicating the notification, the gNB 1 may move the UE 2 (i.e., may cause the UE 2 to transition) to the RRC_CONNECTED state, or may keep the UE 2 in the RRC_INACTIVE state. In some implementations, the gNB 1 may move the UE 2 to an appropriate cell when the network slice requested by the UE 2 is not available in the gNB 1 or the cell thereof. Specifically, the gNB 1 may move the UE 2 to another cell in which the network slice requested by the UE 2 is available (or supported). The other cell to which UE 2 is to be moved may be another cell served by the same gNB 1 as the cell (i.e., the cell reselected by the UE 2) in which the gNB 1 has received the notification about the desired network slice from the UE 2. Alternatively, the other cell to which the UE 2 is to be moved may be a cell of another gNB 1. The gNB 1 may use a handover procedure or a redirection procedure (e.g., RRC connection release with redirection) to move the UE 2 to the appropriate cell.

When the UE 2 receives the RAN notification area information including the plurality of RAN notification areas and transmits uplink data (i.e., there is uplink data to be transmitted) in the cell after the cell reselection, it may operate as follows. The UE 2 may determine whether the network slice to which the uplink data belongs (or with which the uplink data is associated) is available (or supported) in the cell depending on whether the RAN notification area in which the cell is included corresponds to the network slice, or whether the RAN notification area corresponding to the network slice includes the cell. For example, when the RAN notification area corresponding to the network slice to which the uplink data to be transmitted belongs (or the network slice associated therewith) includes the cell after the cell reselection, the UE 2 may transmit the uplink data. Otherwise, the UE 2 may notify the gNB 1 of the desired network slice.

As can be understood from the above description, the gNB 1 according to this embodiment is configured to transmit the slice availability information to the UE 2. The slice availability information indicates whether one or more network slices configured in (or selected for) the UE 2 for data communication at least in the RRC_CONNECTED state are available in each cell included in the RAN notification area for the UE 2. Accordingly, the slice availability information enables the UE 2 to check whether the desired network slice is available in the cell to be reselected (or in the reselected cell) by cell reselection in the RRC_INACTIVE state. Thus, this embodiment can facilitate the UE 2 in the RRC_INACTIVE state to know the availability of the network slice in the cell to be reselected or in the reselected cell.

Second Embodiment

This embodiment provides a modified example of the mobility of the UE 2 in the RRC_INACTIVE state. A configuration example of the radio communication network according to this embodiment is similar to that of FIG. 5.

The gNB 1 according to this embodiment is configured to implicitly inform the UE 2 about whether one or more network slices configured in (or selected, allowed, or accepted for) the UE 2 for data communication at least in the RRC_CONNECTED state are available in each cell included in the RAN notification area for the UE 2. More specifically, in this embodiment, the gNB 1 is configured to include, in the RAN notification area for the UE 2 in the RRC_INACTIVE state, only one or more cells in which the network slice configured for the UE 2 in the RRC_CONNECTED state is available (or supported), and to configure the RAN notification area in the UE 2. Thus, the RAN notification area implicitly indicates that the network slice configured in the UE 2 is available in each cell included in the RAN notification area.

Figure 10:
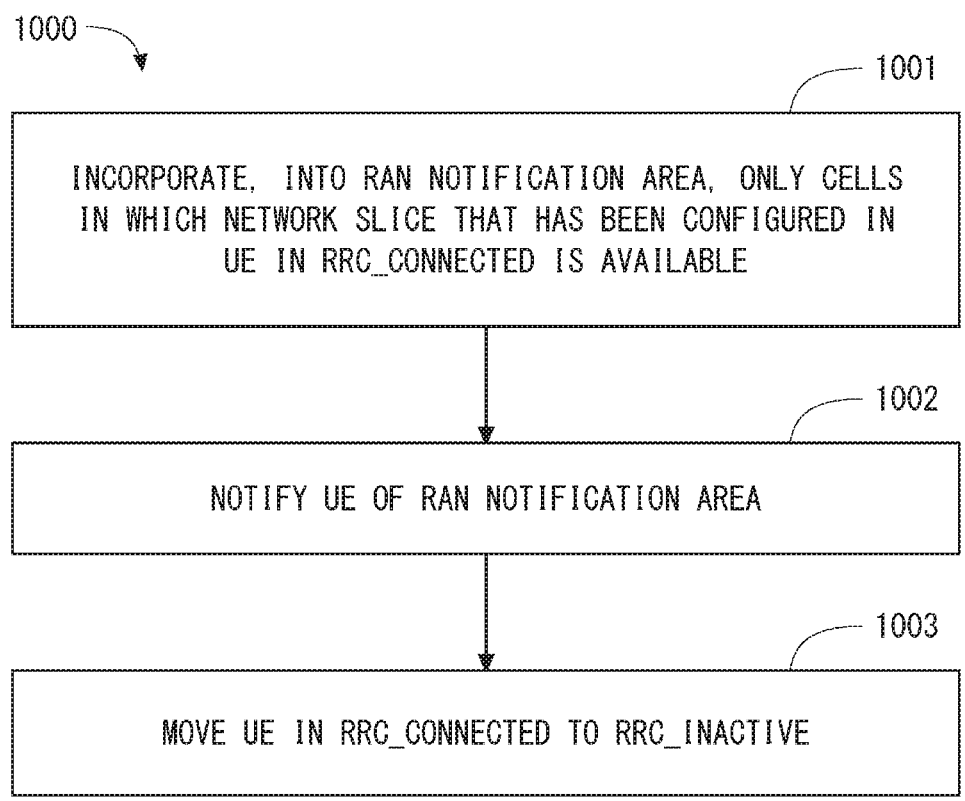
FIG. 10 is a flowchart showing an example of an operation of a gNB according to a second embodiment.

FIG. 10 is a flowchart showing a process 1000 that is an example of the operation of the gNB 1. In Step 1001, the gNB 1 includes, in the RAN notification area, only one or more cells in which the network slice that have been configured in the UE 2 in the RRC_CONNECTED state is available. In Step 1002, the gNB 1 notifies the UE 2 of the determined RAN notification area. In Step 1003, the gNB 1 moves the UE 2 from the RRC_CONNECTED state to the RRC_INACTIVE state.

Figure 11:
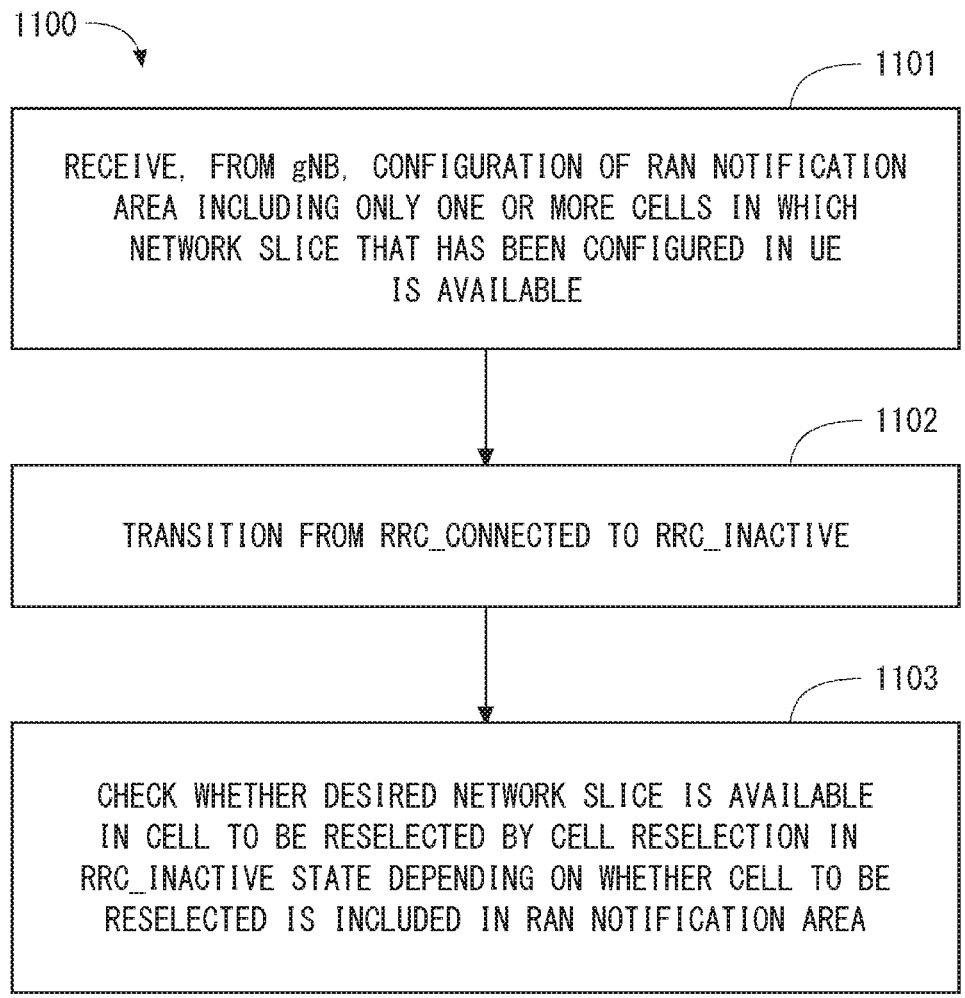
FIG. 11 is a flowchart showing an example of an operation of a UE according to the second embodiment.

FIG. 11 is a flowchart showing a process 1100 that is an example of the operation of the UE 2. In Step 1101, the UE 2 is in the RRC_CONNECTED state and receives the configuration of the RAN notification area from the serving gNB 1. This RAN notification area includes only one or more cells in which the network slice that have been configured in the UE 2 is available. In Step 1102, the UE 2 transitions from the RRC_CONNECTED state to the RRC_INACTIVE state in response to an instruction from the serving gNB 1. In Step 1103, the UE 2 in the RRC_INACTIVE state performs cell reselection. The UE 2 checks whether a desired network slice(s) is available in the cell to be reselected depending on whether the cell to be reselected is included in the RAN notification area. Here, the desired network slice(s) may be one or more network slices that had been configured in (or allowed or accepted for) the UE 2 by the network (i.e., 5G-CN 4 or 5G-RAN 3 or both) when the UE 2 was formerly in the RRC_CONNECTED state.

The operations of the UE 2 and the gNB 1 after the UE 2 checks the network slice availability may be similar to that of the example described in the first embodiment.

The gNB 1 may configure a plurality of RAN notification areas in the UE 2 and may transmit the RAN notification area information including the plurality of RAN notification areas to the UE 2. At least one of the RAN notification areas included in the RAN notification area information may be determined to include only one or more cells in which the network slice configured (or selected, allowed, or accepted) for the UE 2 is available (or supported). For example, both the first and second RAN notification areas may be configured in the UE 2 and the first RAN notification area may only include one or more cells in which the network slice configured (or selected, allowed, or accepted) for the UE 2 is available (or supported), while the second RAN notification area may include one or more cells in which the UE 2 can move (i.e., perform cell reselection) without notifying the gNB 1. In this case, the second RAN notification area may be configured in the UE 2 as a default configuration, whereas the first RAN notification area may be configured in the UE 2 as an optional configuration. Specifically, the gNB 1 may always transmit the second RAN notification area to the UE 2 as the RAN notification area to be applied to the UE 2 regardless of the use of the network slice. In contrast, the gNB 1 may transmit the first RAN notification area to the UE 2 only when the UE 2 uses the network slice or is configured with the network slice.

Additionally or alternatively, the RAN notification area may be configured per slice category or slice type of the network slices configured in (or selected, allowed, or accepted for) the UE 2. In one example, a correspondence between the plurality of RAN notification areas and the plurality of network slices may be determined by a configuration order of the plurality of RAN notification areas and a configuration order of the plurality of network slices. Specifically, the RAN notification area having the first configuration order may be associated with the first network slice having the first configuration order. Alternatively, the correspondence between the plurality of RAN notification areas and the plurality of network slices may be determined by the configuration order of the plurality of RAN notification areas and the ascending order of the identifiers of the plurality of network slices. Specifically, the RAN notification area having the first configuration order may be associated with the network slice having the smallest identifier. When the number of the network slices configured in the UE 2 excluding the above-mentioned default configuration (default RAN notification area) differs from the number of the RAN notification areas configured in the UE 2, the UE 2 may apply the following handling. When the number of the configured network slices is larger than the number of the RAN notification areas, the UE 2 recognizes that remaining network slices which cannot be associated with the RAN notification areas are not available (or supported) in any cell other than the serving cell (i.e., the cell in which the UE 2 receives the RAN notification area information). On the other hand, when the number of the configured network slices is smaller than the number of the RAN notification areas, the UE 2 ignores the remaining RAN notification areas which cannot be associated with the network slices.

As can be understood from the above description, the gNB 1 according to this embodiment determines the RAN notification area including only one or more cells in which one or more network slices configured in (or selected for) the UE 2 for data communication at least in the RRC_CONNECTED state, and notifies the UE 2 of the determined RAN notification area. Accordingly, the RAN notification area enables the UE 2 to check whether the desired network slice is available in the cell to be reselected (or in the reselected cell) by cell reselection in the RRC_INACTIVE state. Thus, this embodiment facilitates the UE 2 in the RRC_INACTIVE state to know the availability of the network slice in the cell to be reselected or in the reselected cell.

Third Embodiment

This embodiment provides a modified example of the mobility of the UE 2 in the RRC_INACTIVE state. A configuration example of the radio communication network according to this embodiment is similar to that of FIG. 5.

The gNB 1 according to this embodiment is configured to transmit, in each of its cells, System Information (SI) indicating one or more network slices available (or supported) or unavailable (or not supported) in the cell. The System information may be included in a broadcast system information block to be broadcast in each cell. Alternatively, the System information may be included in an on-demand system information block to be transmitted to the UE 2 in response to a request message from the UE 2 or in response to a trigger inside the network.

Figure 12:
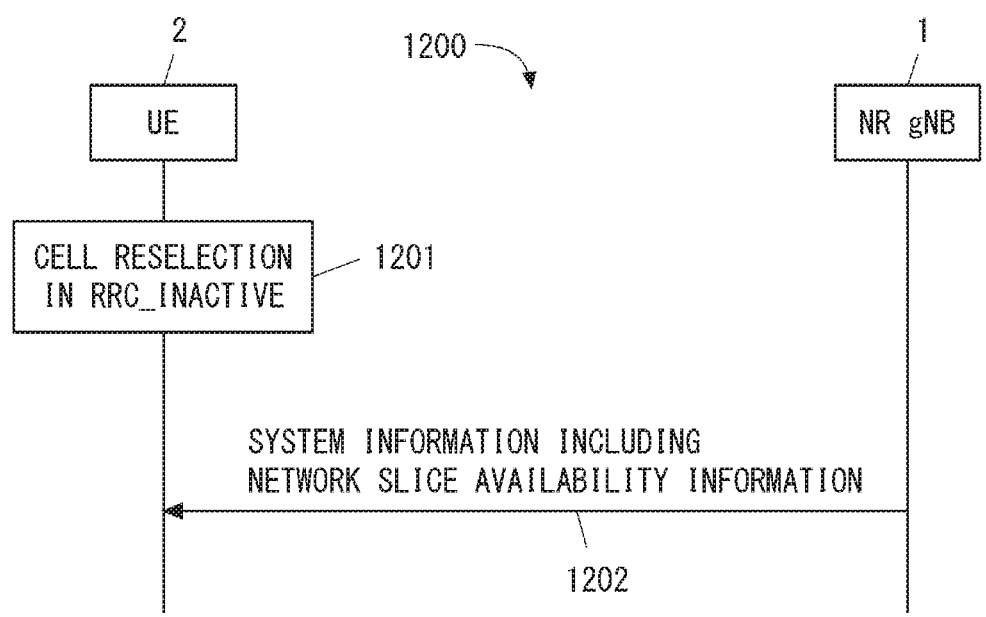
FIG. 12 is a sequence diagram showing an example of operations of a gNB and a UE according to a third embodiment.

FIG. 12 is a sequence diagram showing a process 1200 that is an example of the operations of the gNB 1 and the UE 2 according to this embodiment. In Step 1201, the UE 2 is in the RRC_INACTIVE state and performs a cell reselection procedure. In Step 1202, the UE 2 receives system information from the gNB 1 in the cell to be reselected (or in the reselected cell). The system information includes network slice availability information. The network slice availability information indicates one or more network slices available or unavailable in the cell. As described above, the network slice availability information may be included in on-demand system information block.

When the network slice availability information is a broadcast system information block, the UE 2 may receive the broadcast system information block in the reselected cell in response to the cell reselection and may check the network slice availability in the reselected cell.

When the network slice availability information is an on-demand system information block, for example, the gNB 1 broadcasts primary information (e.g., indication of system information on the network slicing, or availability of network slicing SI) indicating that system information indicating the network slice availability information is to be transmitted as an on-demand system information block. When the primary information is transmitted as system information (e.g., Essential system information of LTE, or Minimum system information of the NR) necessary for the UE 2 to access the cell, the UE 2 receives the primary information before performing the cell reselection. Then, upon (or in response to) performing the cell reselection, the UE 2 requests the gNB 1 to transmit the on-demand system information block. The gNB 1 transmits the network slice availability information in response to the request from the UE 2.

The UE 2 may immediately transmit the transmission request for the on-demand system information block in response to the cell reselection. Alternatively, the UE 2 may transmit the transmission request for the on-demand system information block when transitioning to the RRC_CONNECTED state due to an occurrence of the uplink data to be transmitted or for other purposes. Additionally or alternatively, the UE 2 may transmit the transmission request for the on-demand system information block while remaining in the RRC_INACTIVE state. When the primary information is transmitted in other system information (i.e., information other than the system information necessary for the UE 2 to access the cell), the UE 2 may receive the primary information after (or in response to) performing the cell reselection. In some implementations, the UE 2 may transmit the transmission request for the on-demand system information block on a Random Access Channel (RACH), or via dedicated signalling (e.g., RRC signalling or Medium Access Control (MAC) Control Element (CE)).

Figure 13:
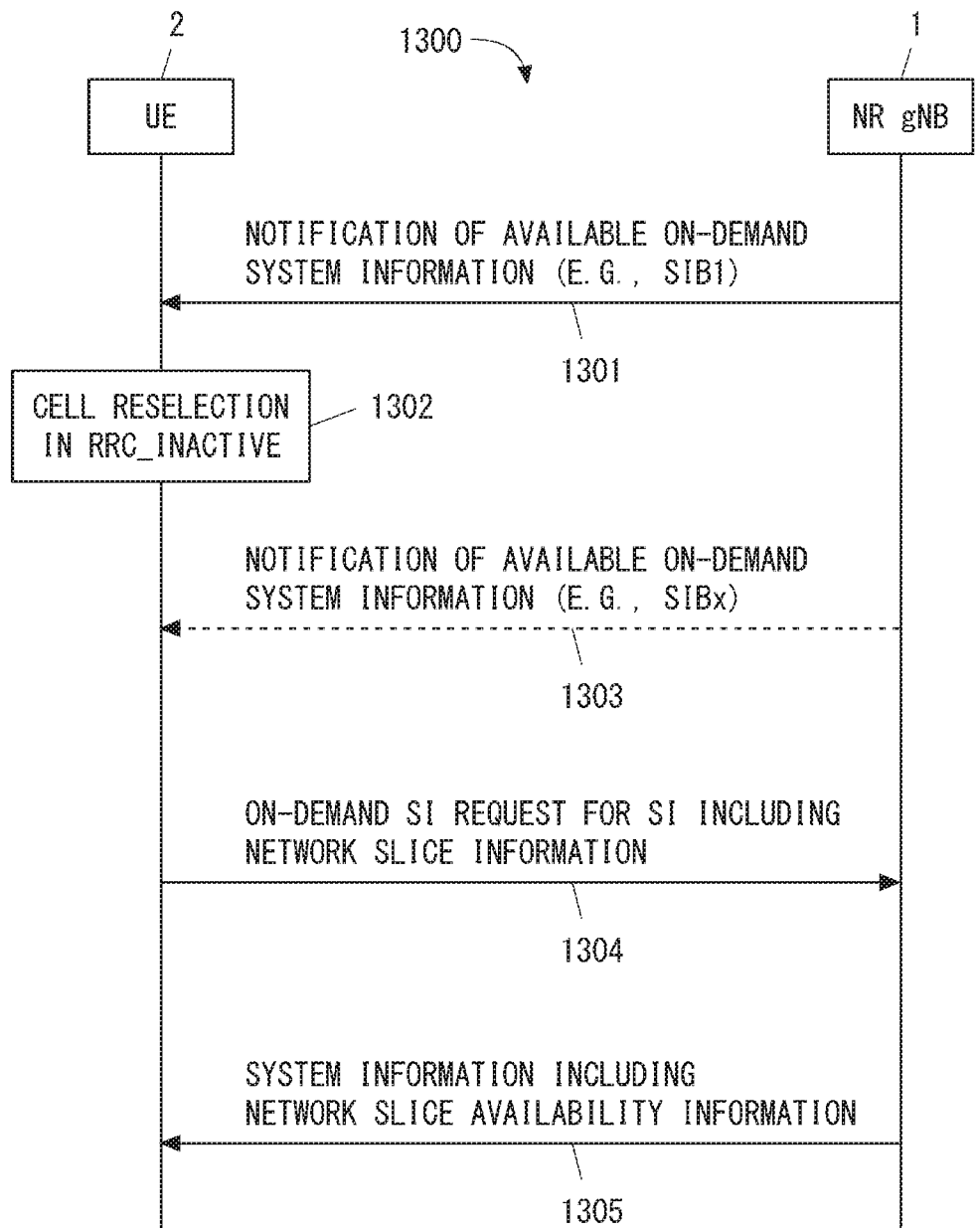
FIG. 13 is a sequence diagram showing an example of operations of a gNB and a UE according to the third embodiment.

FIG. 13 is a sequence diagram showing a process 1300 that is an example of the operations of the gNB 1 and the UE 2 when the network slice availability information is the on-demand system information block. In Step 1301, the gNB 1 transmits the notification about available on-demand system information. The notification about the available on-demand system information corresponds to the above-described primary information. The notification is necessary for the UE 2 to access the cell 11 of the gNB 1 and is included in the system information (e.g., Essential SI, SIB1) which is broadcast in the cell 11 of the gNB 1. Alternatively, the notification about available on-demand system information may be included in another SI that is not Essential SI.

In Step 1302, the UE 2 is in the RRC_INACTIVE state and performs a cell reselection procedure. The UE 2 checks the "notification about available on-demand system information" included in the system information received in Step 1301 and then sends a transmission request for the on-demand SI including the network slice information to the gNB 1 (Step 1304). Note that when the notification about available on-demand system information is included in another SI that is not the Essential SI, the UE 2 may receive the other SI (e.g., SIBx) after the cell reselection (Step 1303). Step 1303 is omitted when the notification about available on-demand system information is included in the Essential SI (e.g., SIB1). In Step 1305, the UE 2 receives the system information including the network slice availability information from the gNB 1.

Figure 14:
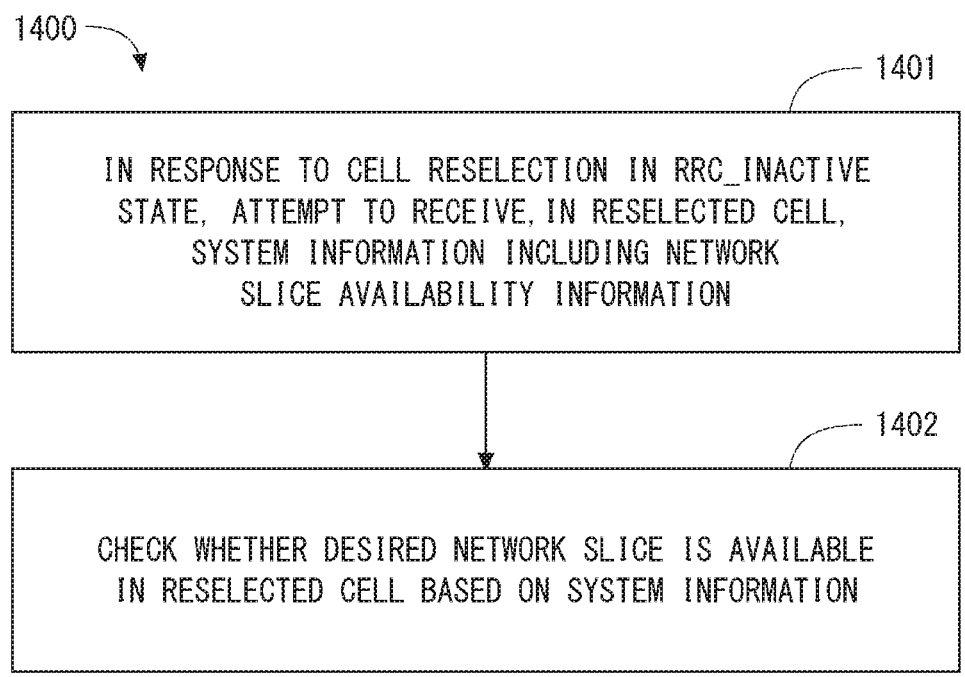
FIG. 14 is a flowchart showing an example of an operation of a UE according to the third embodiment.

FIG. 14 is a flowchart showing a process 1400 that is an example of the operation of the UE 2. In Step 1401, in response to the cell reselection in the RRC_INACTIVE state, the UE 2 attempts to receive the system information including the network slice availability information in the reselected cell. In Step 1402, the UE 2 checks whether a desired network slice(s) is available in the reselected cell based on the received system information. Here, the desired network slice(s) may be one or more network slices that had been configured in (or allowed or accepted for) the UE 2 by the network (i.e., 5G-CN 4 or 5G-RAN 3 or both) when the UE 2 was formerly in the RRC_CONNECTED state.

The operations of the UE 2 and the gNB 1 after the UE 2 checks the network slice availability may be similar to that of the example described in the first embodiment.

As can be understood from the above description, the gNB 1 according to this embodiment transmits, in each cell, the system information indicating the network slice availability in the cell. Accordingly, the system information enables the UE 2 to check whether the desired network slice is available in the cell to be reselected (or in the reselected cell) by cell reselection in the RRC_INACTIVE state. Thus, this embodiment facilitates the UE 2 in the RRC_INACTIVE state to know the availability of the network slice in the cell to be reselected or in the reselected cell.

Fourth Embodiment

This embodiment provides an operation when downlink user data addressed to the UE 2 in the RRC_INACTIVE state arrives at the network. A configuration example of a radio communication network according to this embodiment is similar to that of FIG. 5.

When downlink user data addressed to the UE 2 in the RRC_INACTIVE state arrives at the 5G-CN 4, the 5G-CN 4 transfers the user data to the gNB 1 (e.g., gNB 1A) to which the UE 2 had been connected at the time when the UE 2 was transitioned to the RRC_INACTIVE state. The gNB 1A transmits, in its cell 11A, a notification of arrival of the downlink user data similar to the existing paging (i.e., paging message), which is referred to as "RAN-based paging". Furthermore, when the RAN notification area (RNA) configured in the UE 2 includes a cell of another gNB 1 (e.g., gNB 1B), the gNB 1 informs the gNB 1B about the arrival of the downlink user data for the UE 2 through the inter-gNB interface (Xn), which is referred to as "Xn paging". The Xn paging may include information regarding the RAN notification area (RNA) to which the UE 2 belongs. Then, in a manner similar to the gNB 1A, the gNB 1B may transmit the RAN-based paging in its cell 11B which is included in the RNA.

The gNB 1A may include, into the Xn paging (i.e., the notification of the arrival of the downlink user data for the UE 2) to be transmitted to the gNB 1B, information indicating one or more network slices which had been configured in (or allowed or accepted for) the UE 2. This allows the gNB 1B to know the network slice(s) used (or desired) by the UE 2.

The gNB 1A may include, into the Xn paging (i.e., the notification of the arrival of the downlink user data for the UE 2) to be sent to the gNB 1B, information regarding the RAN notification area(s) that the UE 2 has been configured with (or has been notified of). This allows the gNB 1B to know the cell to which the RAN-based paging should be transmitted.

Figure 15:
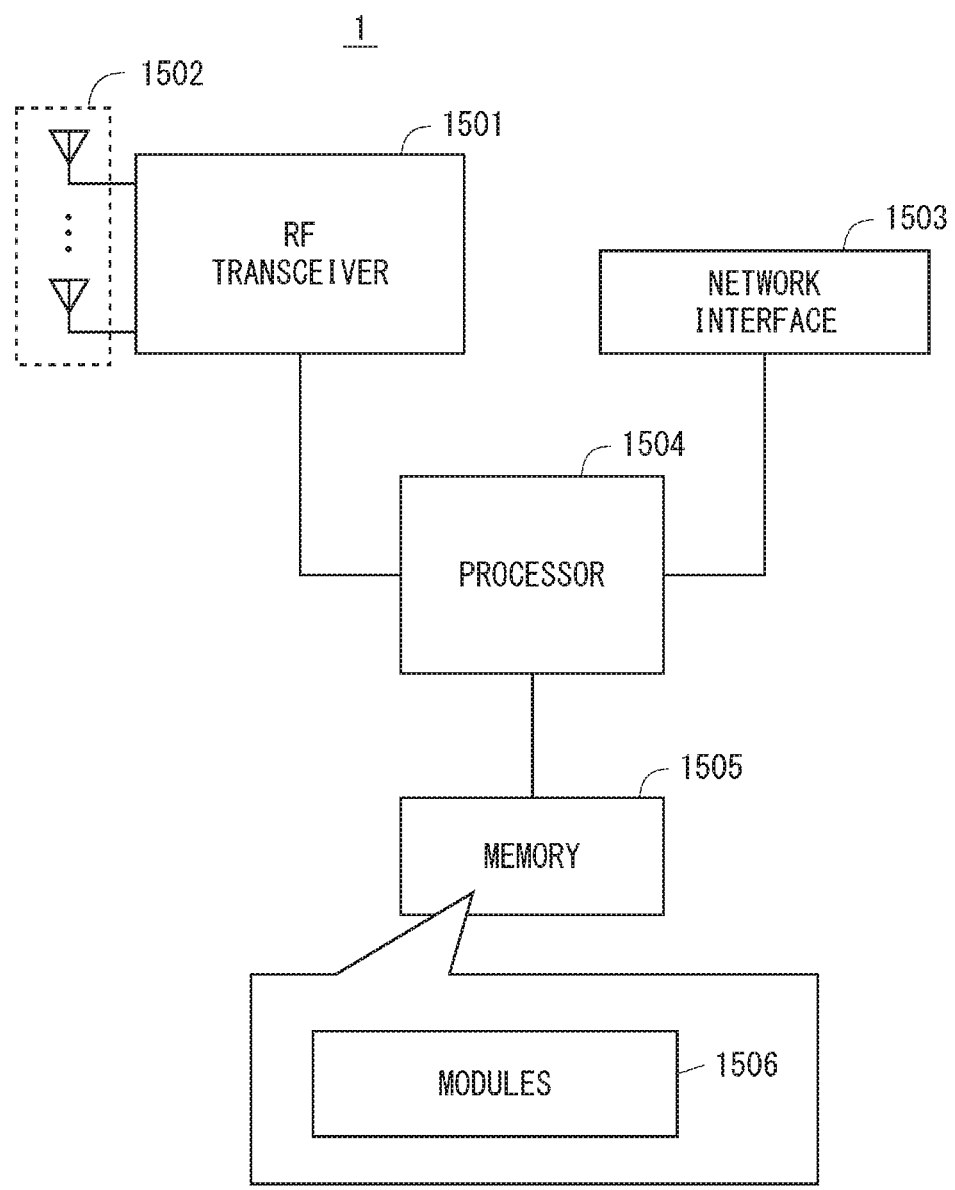
FIG. 15 is a block diagram showing a configuration example of a gNB according to a plurality of embodiments.

The following provides configuration examples of the gNB 1 and the UE 2 according to the above embodiments. FIG. 15 is a block diagram showing a configuration example of the gNB 1 according to the above embodiments. Referring to FIG. 15, the gNB 1 includes a Radio Frequency transceiver 1501, a network interface 1503, a processor 1504, and a memory 1505. The RF transceiver 1501 performs analog RF signal processing to communicate with NG UEs including the UE 2. The RF transceiver 1501 may include a plurality of transceivers. The RF transceiver 1501 is coupled to an antenna array 1502 and the processor 1504. The RF transceiver 1501 receives modulated symbol data from the processor 1504, generates a transmission RF signal, and supplies the transmission RF signal to the antenna array 1502. Further, the RF transceiver 1501 generates a baseband reception signal based on a reception RF signal received by the antenna array 1502 and supplies the baseband reception signal to the processor 1504. The RF transceiver 1501 may include an analog beamformer circuit for beam forming. The analog beamformer circuit includes, for example, a plurality of phase shifters and a plurality of power amplifiers.

The network interface 1503 is used to communicate with network nodes (e.g., a control node and a transfer node in the 5G-CN 4). The network interface 1503 may include, for example, a network interface card (NIC) conforming to the IEEE 802.3 series.

The processor 1504 performs digital baseband signal processing (i.e., data-plane processing) and control-plane processing for radio communication. The processor 1504 may include a plurality of processors. The processor 1504 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing. The processor 1504 may include a digital beamformer module for beam forming. The digital beamformer module may include a Multiple Input Multiple Output (MIMO) encoder and a pre-coder.

The memory 1505 is composed of a combination of a volatile memory and a non-volatile memory. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1505 may include a storage located apart from the processor 1504. In this case, the processor 1504 may access the memory 1505 via the network interface 1503 or an I/O interface (not shown).

The memory 1505 may store one or more software modules (computer programs) 1506 including instructions and data to perform processing by the gNB 1 described in the above embodiments. In some implementations, the processor 1504 may be configured to load the software modules 1506 from the memory 1505 and execute the loaded software modules, thereby performing processing of the gNB 1 described in the above embodiments.

Figure 16:
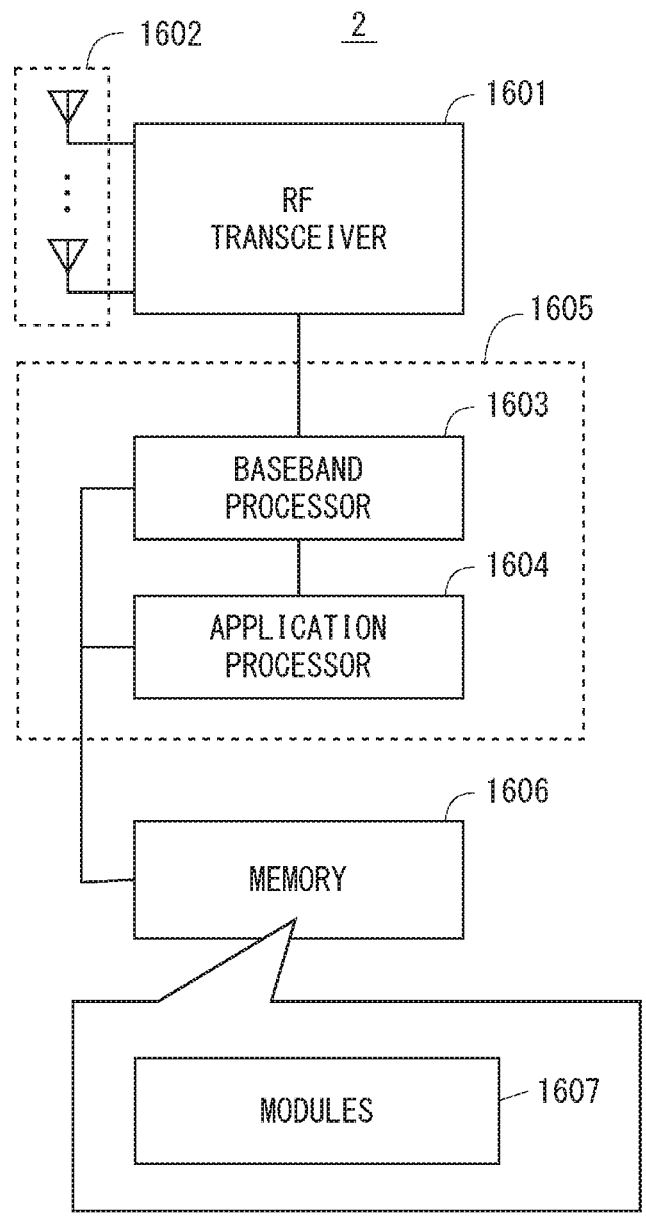
FIG. 16 is a block diagram showing a configuration example of a UE according to a plurality of embodiments.

FIG. 16 is a block diagram showing a configuration example of the UE 2. A Radio Frequency (RF) transceiver 1601 performs analog RF signal processing to communicate with the gNB 1. The RF transceiver 1601 may include a plurality of transceivers. The analog RF signal processing performed by the RF transceiver 1601 includes frequency up-conversion, frequency down-conversion, and amplification. The RF transceiver 1601 is coupled to an antenna array 1602 and a baseband processor 1603. The RF transceiver 1601 receives modulated symbol data (or OFDM symbol data) from the baseband processor 1603, generates a transmission RF signal, and supplies the transmission RF signal to the antenna array 1602. Further, the RF transceiver 1601 generates a baseband reception signal based on a reception RF signal received by the antenna array 1602 and supplies the baseband reception signal to the baseband processor 1603. The RF transceiver 1601 may include an analog beamformer circuit for beam forming. The analog beamformer circuit includes, for example, a plurality of phase shifters and a plurality of power amplifiers.

The baseband processor 1603 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1603 may include, for example, signal processing of a Packet Data Convergence Protocol (PDCP) layer, a Radio Link Control (RLC) layer, a MAC layer, and a PHY layer. Further, the control-plane processing performed by the baseband processor 1603 may include processing of a Non-Access Stratum (NAS) protocol, an RRC protocol, and MAC CEs.

The baseband processor 1603 may perform MIMO encoding and pre-coding for beam forming.

The baseband processor 1603 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 1604 described in the following.

The application processor 1604 is also referred to as a CPU, an MPU, a microprocessor, or a processor core. The application processor 1604 may include a plurality of processors (processor cores). The application processor 1604 loads a system software program (Operating System (OS)) and various application programs (e.g., a call application, a WEB browser, a mailer, a camera operation application, and a music player application) from a memory 1606 or from another memory (not shown) and executes these programs, thereby providing various functions of the UE 2.

In some implementations, as represented by a dashed line (1605) in FIG. 16, the baseband processor 1603 and the application processor 1604 may be integrated on a single chip. In other words, the baseband processor 1603 and the application processor 1604 may be implemented in a single System on Chip (SoC) device 1605. An SoC device may be referred to as a system Large Scale Integration (LSI) or a chipset.

The memory 1606 is a volatile memory, a non-volatile memory, or a combination thereof. The memory 1606 may include a plurality of memory devices that are physically independent from each other. The volatile memory is, for example, an SRAM, a DRAM, or a combination thereof. The non-volatile memory is, for example, an MROM, an EEPROM, a flash memory, a hard disc drive, or any combination thereof. The memory 1606 may include, for example, an external memory device that can be accessed from the baseband processor 1603, the application processor 1604, and the SoC 1605. The memory 1606 may include an internal memory device that is integrated in the baseband processor 1603, the application processor 1604, or the SoC 1605. Further, the memory 1606 may include a memory in a Universal Integrated Circuit Card (UICC).

The memory 1606 may store one or more software modules (computer programs) 1607 including instructions and data to perform the processing by the UE 2 described in the above embodiments. In some implementations, the baseband processor 1603 or the application processor 1604 may load these software modules 1607 from the memory 1606 and execute the loaded software modules, thereby performing the processing of the UE 2 described in the above embodiments with reference to the drawings.

As described above with reference to FIGS. 15 and 16, each of the processors included in the gNB 1 and the UE 2 according to the above-described embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

The 5G-RAN 3 described in the above embodiments may be implemented based on a Cloud Radio Access Network (C-RAN) concept. The C-RAN is also referred to as a Centralized RAN. In this case, processes and operations performed by the gNB 1 described in the above embodiments may be provided by a Digital Unit (DU) included in the C-RAN architecture, or by a combination of a DU and a Radio Unit (RU). The DU is also referred to as a Baseband Unit (BBU) or a Central Unit (CU). The RU is also referred to as a Remote Radio Head (RRH), a Remote Radio Equipment (RRE), a Distributed Unit (DU), or a Transmission and Reception Point (TRP or TRxP). That is, processes and operations performed by the gNB 1 described in the above embodiments may be provided by one or more radio stations (or RAN nodes).

The above-described embodiments have been described focusing on the cell reselection by the UE in the RRC_INACTIVE state. However, the network slice availability may be configured, for example, not only for each cell but also for each PLMN. That is, whether the desired network slice of the UE 2 is available (or supported) in the camping cell may be different between PLMNs. For example, the network slice availability information may be sent to the UE 2 per PLMN. When the desired network slice is not available (or not supported) in the selected PLMN of the UE 2, the UE AS layer may inform the NAS layer about it. At this time, the AS layer may also notify the NAS layer of the information regarding the network slice per PLMN (e.g., information regarding whether the network slice is available, or information regarding available network slices). Then, the NAS layer may execute PLMN selection in consideration of this information received from the AS layer and may notify the AS layer about the result (i.e., newly selected PLMN).

As already described, the above-described embodiments may be applied to other radio communication systems which support network slicing and uses the RRC_INACTIVE state or a similar RRC state. For example, a case may be considered in which LTE E-UTRAN (eNB) is connected to the 5G-CN and the network slicing is supported in E-UTRAN cells. Furthermore, a case may be assumed in which, as in the above-described RRC_INACTIVE state, a state (or a sub-state, or an operation mode) in which the UE and the eNB maintain at least part of the AS context of the UE and the location of the UE is known to the E-UTRAN at a level of a predetermined area configured by the E-UTRAN is supported. In this case, the predetermined area may be similar to the RAN notification area or may be the same as the location registration area (e.g., TA) of the core network.

Further, the above-described embodiments are merely examples of applications of the technical ideas obtained by the inventors. These technical ideas are not limited to the above-described embodiments and various modifications may be made thereto.

For example, the whole or part of the above embodiments can be described as, but not limited to, the following supplementary notes.

(Supplementary Note 1)

A base station placed in a Radio Access Network (RAN), the base station comprising:

a memory; and at least one processor coupled to the memory and configured to control state transitions of a first radio terminal among first to third RRC states, wherein the first RRC state is a state in which the first radio terminal and the RAN maintain an access stratum (AS) context and in which a location of the first radio terminal is known to the RAN at cell level, the second RRC state is a state in which the first radio terminal and the RAN maintain at least part of the AS context and in which the location of the first radio terminal is known to the RAN at RAN notification area level configured by the RAN, the third RRC state is a state in which the first radio terminal and the RAN have released the AS context and in which the location of the first radio terminal is not known to the RAN, and the at least one processor is further configured to explicitly or implicitly inform the first radio terminal about whether a first network slice configured in the first radio terminal for data communication at least in the first RRC state is available in each cell included in the RAN notification area.

(Supplementary Note 2)

The base station according to Supplementary Note 1, wherein the at least one processor is configured to transmit, to the first radio terminal, first information explicitly indicating whether the first network slice is available in each cell included in the RAN notification area.
(Supplementary Note 3)
The base station according to Supplementary Note 2, wherein the at least one processor is configured to transmit the first information to the first radio terminal when configuring the RAN notification area in the first radio terminal.
(Supplementary Note 4)
The base station according to Supplementary Note 2 or 3, wherein the at least one processor is configured to transmit the first information to the first radio terminal during a procedure for moving the first radio terminal from the first RRC state to the second RRC state.
(Supplementary Note 5)
The base station according to Supplementary Note 1, wherein
the at least one processor is configured to include, in the RAN notification area for the first radio terminal, only one or more cells in which the first network slice is available and configure the RAN notification area in the first radio terminal, and
the RAN notification area implicitly indicates that the first network slice is available in each cell included in the RAN notification area.
(Supplementary Note 6)
The base station according to any one of Supplementary Notes 1 to 5, wherein the at least one processor is configured to receive from another base station, through an inter-base station interface, information indicating one or more network slices available or unavailable in each cell of the other base station.
(Supplementary Note 7)
The base station according to any one of Supplementary Notes 1 to 6, wherein the at least one processor is configured to receive from a second radio terminal, during a procedure for moving the second radio terminal from the second RRC state to the first RRC state or thereafter, second information indicating a second network slice which had been configured in the second radio terminal when the second radio terminal was formerly in the first RRC state.
(Supplementary Note 8)
The base station according to Supplementary Note 7, wherein the at least one processor is configured to move the second radio terminal to another base station or another cell when the second network slice is not available in the base station or in a cell to which the second radio terminal is connected.
(Supplementary Note 9)
The base station according to any one of Supplementary Notes 1 to 8, wherein
the first RRC state is an RRC_CONNECTED state,
the second RRC state is an RRC_INACTIVE state, and
the third RRC state is an RRC_IDLE state.
(Supplementary Note 10)
The base station according to any one of Supplementary Notes 1 to 9, wherein the RAN notification area is an area where, when the radio terminal in the second RRC state moves between cells by cell reselection, the radio terminal does not need to notify the RAN of the cell reselection.
(Supplementary Note 11)
A base station placed in a Radio Access Network (RAN), the base station comprising:
a memory; and
at least one processor coupled to the memory and configured to control state transitions of a radio terminal among first to third RRC states, wherein the first RRC state is a state in which the radio terminal and the RAN maintain an access stratum (AS) context and in which a location of the radio terminal is known to the RAN at cell level,
the second RRC state is a state in which the radio terminal and the RAN maintain at least part of the AS context and in which the location of the radio terminal is known to the RAN at RAN notification area level configured by the RAN,
the third RRC state is a state in which the radio terminal and the RAN have released the AS context and in which the location of the radio terminal is not known to the RAN, and
the at least one processor is further configured to transmit, in a first cell of the base station, system information indicating one or more network slices available or unavailable in the first cell.
(Supplementary Note 12)
The base station according to Supplementary Note 11, wherein the system information is broadcast system information to be broadcast in the first cell or is on-demand system information to be transmitted to the radio terminal in response to a request message from the radio terminal.
(Supplementary Note 13)
The base station according to Supplementary Note 11 or 12, wherein the at least one processor is configured to receive from the radio terminal, during a procedure for moving the radio terminal from the second RRC state to the first RRC state or thereafter, information indicating a first network slice which had been configured in the radio terminal when the radio terminal was formerly in the first RRC state.
(Supplementary Note 14)
The base station according to Supplementary Note 13, wherein the at least one processor is configured to move the radio terminal to another base station or another cell when the first network slice is not available in the base station or in a cell to which the radio terminal is connected.
(Supplementary Note 15)
The base station according to any one of Supplementary Notes 11 to 14, wherein
the first RRC state is an RRC_CONNECTED state,
the second RRC state is an RRC_INACTIVE state, and
the third RRC state is an RRC_IDLE state.
(Supplementary Note 16)
A radio terminal comprising:
a transceiver; and
at least one processor configured to control the transceiver in one or more cells associated with a radio access network (RAN), wherein
the at least one processor is configured to control state transitions of the radio terminal among first to third RRC states,
the first RRC state is a state in which the radio terminal and the RAN maintain an access stratum (AS) context and in which a location of the radio terminal is known to the RAN at cell level,
the second RRC state is a state in which the radio terminal and the RAN maintain at least part of the AS context and in which the location of the radio terminal is known to the RAN at RAN notification area level configured by the RAN,
the third RRC state is a state in which the radio terminal and the RAN have released the AS context and in which the location of the radio terminal is not known to the RAN, and
the at least one processor is further configured to check whether a first network slice configured in the radio terminal for data communication at least in the first RRC state is available in a cell to be reselected by cell reselection in the second RRC state.

(Supplementary Note 17)
The radio terminal according to Supplementary Note 16, wherein the at least one processor is configured to receive, from a base station in the RAN, first information explicitly indicating whether the first network slice is available in each cell included in the RAN notification area.

(Supplementary Note 18)
The radio terminal according to Supplementary Note 17, wherein the at least one processor is configured to receive the first information during a procedure in which the first radio terminal transitions from the first RRC state to the second RRC state.

(Supplementary Note 19)
The radio terminal according to Supplementary Note 16, wherein
the RAN notification area includes only one or more cells in which the first network slice is available,
the at least one processor is configured to receive a configuration of the RAN notification area from a base station in the RAN, and
the at least one processor is configured to check whether the first network slice is available in the cell to be reselected, depending on whether the cell to be reselected is included in the RAN notification area.

(Supplementary Note 20)
The radio terminal according to Supplementary Note 16, wherein
the at least one processor is configured to, in response to the cell reselection in the second RRC state, attempt to receive system information indicating one or more network slices available or unavailable in the cell to be reselected,
the at least one processor is configured to, based on the system information, check whether the first network slice is available in the cell to be reselected.

(Supplementary Note 21)
The radio terminal according to Supplementary Note 20, wherein the system information is broadcast system information to be broadcast in the cell to be reselected or is on-demand system information to be transmitted to the radio terminal in response to a request message from the radio terminal.

(Supplementary Note 22)
The radio terminal according to any one of Supplementary Notes 16 to 21, wherein the at least one processor is configured to, in response to failing to confirm that the first network slice is available in the cell to be reselected, transmit second information indicating the first network slice to a base station of the cell to be reselected, during a procedure in which the radio terminal transitions from the second RRC state to the first RRC state in the cell to be reselected or thereafter.

(Supplementary Note 23)
The radio terminal according to any one of Supplementary Notes 16 to 22, wherein
the first RRC state is an RRC_CONNECTED state,
the second RRC state is an RRC_INACTIVE state, and
the third RRC state is an RRC_IDLE state.

(Supplementary Note 24)
A method for a base station placed in a Radio Access Network (RAN), the method comprising:
controlling state transitions of a first radio terminal among first to third RRC states; and
explicitly or implicitly informing the first radio terminal about whether a first network slice configured in the first radio terminal for data communication at least in the first RRC state is available in each cell included in a RAN notification area configured by the RAN, wherein
the first RRC state is a state in which the first radio terminal and the RAN maintain an access stratum (AS) context and in which a location of the first radio terminal is known to the RAN at cell level,
the second RRC state is a state in which the first radio terminal and the RAN maintain at least part of the AS context and in which the location of the first radio terminal is known to the RAN at RAN notification area level,
the third RRC state is a state in which the first radio terminal and the RAN have released the AS context and in which the location of the first radio terminal is not known to the RAN.

(Supplementary Note 25)
A method for a base station placed in a Radio Access Network (RAN), the method comprising:
controlling state transitions of a radio terminal among first to third RRC states; and
transmitting, in a first cell of the base station, system information indicating one or more network slices available or unavailable in the first cell, wherein
the first RRC state is a state in which the radio terminal and the RAN maintain an access stratum (AS) context and in which a location of the radio terminal is known to the RAN at cell level,
the second RRC state is a state in which the radio terminal and the RAN maintain at least part of the AS context and in which the location of the radio terminal is known to the RAN at RAN notification area level configured by the RAN,
the third RRC state is a state in which the radio terminal and the RAN have released the AS context and in which the location of the radio terminal is not known to the RAN.

(Supplementary Note 26)
A method for a radio terminal, the method comprising:
controlling state transitions of the radio terminal among first to third RRC states; and
checking whether a first network slice configured in the radio terminal for data communication at least in the first RRC state is available in a cell to be reselected by cell reselection in the second RRC state, wherein
the first RRC state is a state in which the radio terminal and a radio access network (RAN) maintain an access stratum (AS) context and in which a location of the radio terminal is known to the RAN at cell level,
the second RRC state is a state in which the radio terminal and the RAN maintain at least part of the AS context and in which the location of the radio terminal is known to the RAN at RAN notification area level configured by the RAN,
the third RRC state is a state in which the radio terminal and the RAN have released the AS context and in which the location of the radio terminal is not known to the RAN.

(Supplementary Note 27)
A program for causing a computer to perform a method for a base station placed in a Radio Access Network (RAN), wherein the method comprises:
controlling state transitions of a first radio terminal among first to third RRC states; and
explicitly or implicitly informing the first radio terminal about whether a first network slice configured in the first radio terminal for data communication at least in the first RRC state is available in each cell included in a RAN notification area configured by the RAN, wherein
the first RRC state is a state in which the first radio terminal and the RAN maintain an access stratum (AS) context and in which a location of the first radio terminal is known to the RAN at cell level,
the second RRC state is a state in which the first radio terminal and the RAN maintain at least part of the AS context and in which the location of the first radio terminal is known to the RAN at RAN notification area level, the third RRC state is a state in which the first radio terminal and the RAN have released the AS context and in which the location of the first radio terminal is not known to the RAN.

(Supplementary Note 28)

A program for causing a computer to perform a method for a base station placed in a Radio Access Network (RAN), wherein the method comprises:

controlling state transitions of a radio terminal among first to third RRC states; and transmitting, in a first cell of the base station, system information indicating one or more network slices available or unavailable in the first cell, wherein the first RRC state is a state in which the radio terminal and the RAN maintain an access stratum (AS) context and in which a location of the radio terminal is known to the RAN at cell level, the second RRC state is a state in which the radio terminal and the RAN maintain at least part of the AS context and in which the location of the radio terminal is known to the RAN at RAN notification area level configured by the RAN, the third RRC state is a state in which the radio terminal and the RAN have released the AS context and in which the location of the radio terminal is not known to the RAN.

(Supplementary Note 29)

A program for causing a computer to perform a method for a radio terminal, wherein the method comprises:

controlling state transitions of the radio terminal among first to third RRC states; and checking whether a first network slice configured in the radio terminal for data communication at least in the first RRC state is available in a cell to be reselected by cell reselection in the second RRC state, wherein the first RRC state is a state in which the radio terminal and a radio access network (RAN) maintain an access stratum (AS) context and in which a location of the radio terminal is known to the RAN at cell level, the second RRC state is a state in which the radio terminal and the RAN maintain at least part of the AS context and in which the location of the radio terminal is known to the RAN at RAN notification area level configured by the RAN, the third RRC state is a state in which the radio terminal and the RAN have released the AS context and in which the location of the radio terminal is not known to the RAN.

This application is based upon and claims the benefit of priority from Japanese Patent Application No. 2017-000800, filed on Jan. 5, 2017, the disclosure of which is incorporated herein in its entirety by reference.

REFERENCE SIGNS LIST 1 gNodeB (gNB)
2 User Equipment (UE)
3 5G Radio Access Network (5G-RAN)
4 5G Core Network (5G-CN)
11 Cell
1501 RF Transceiver
1504 Processor
1505 Memory
1601 RF Transceiver
1603 Baseband Processor
1604 Application Processor
1606 Memory

The invention claimed is:

1. A base station placed in a Radio Access Network (RAN), the base station comprising:

a memory; and at least one processor coupled to the memory and configured to control state transitions of a first radio terminal among first to third RRC states, wherein the first RRC state is a state in which the first radio terminal and the RAN maintain an access stratum (AS) context and in which a location of the first radio terminal is known to the RAN at cell level, the second RRC state is a state in which the first radio terminal and the RAN maintain at least part of the AS context and in which the location of the first radio terminal is known to the RAN at RAN notification area level configured by the RAN, the third RRC state is a state in which no RRC connection is established between the first radio terminal and the RAN, and the at least one processor is further configured to:

include, in the RAN notification area for the first radio terminal, only one or more cells in which a first network slice configured in the first radio terminal for data communication at least in the first RRC state is available; and configure the RAN notification area in the first radio terminal.

2. The base station according to claim 1, wherein the RAN notification area implicitly indicates that the first network slice is available in each cell included in the RAN notification area.

3. The base station according to claim 1, wherein the at least one processor is configured to receive from another base station, through an inter-base station interface, information indicating one or more network slices available or unavailable in each cell of the other base station.

4. The base station according to claim 1, wherein the at least one processor is configured to receive from a second radio terminal, during a procedure for moving the second radio terminal from the second RRC state to the first RRC state or thereafter, second information indicating a second network slice which had been configured in the second radio terminal when the second radio terminal was formerly in the first RRC state.

5. The base station according to claim 4, wherein the at least one processor is configured to move the second radio terminal to another base station or another cell when the second network slice is not available in the base station or in a cell to which the second radio terminal is connected.

6. The base station according to claim 1, wherein
the first RRC state is an RRC_CONNECTED state,
the second RRC state is an RRC_INACTIVE state, and
the third RRC state is an RRC_IDLE state.

7. The base station according to claim 1, wherein the RAN notification area is an area where, when the radio terminal in the second RRC state moves between cells by cell reselection, the radio terminal does not need to notify the RAN of the cell reselection.

8. A radio terminal comprising:

a transceiver; and at least one processor configured to control the transceiver in one or more cells associated with a radio access network (RAN), wherein the at least one processor is configured to control state transitions of the radio terminal among first to third RRC states, the first RRC state is a state in which the radio terminal and the RAN maintain an access stratum (AS) context and in which a location of the radio terminal is known to the RAN at cell level, the second RRC state is a state in which the radio terminal and the RAN maintain at least part of the AS context and in which the location of the radio terminal is known to the RAN at RAN notification area level configured by the RAN, the third RRC state is a state in which no RRC connection is established between the radio terminal and the RAN, and the RAN notification area includes only one or more cells in which the first network slice is available, the at least one processor is further configured to receive (1101) a configuration of the RAN notification area from a base station in the RAN.

9. The radio terminal according to claim 8, wherein the at least one processor is configured to check whether the first network slice is available in the cell to be reselected, depending on whether the cell to be reselected is included in the RAN notification area.

10. The radio terminal according to claim 8, wherein the at least one processor is configured to, in response to the cell reselection in the second RRC state, attempt to receive system information indicating one or more network slices available or unavailable in the cell to be reselected, the at least one processor is configured to, based on the system information, check whether the first network slice is available in the cell to be reselected.

11. The radio terminal according to claim 10, wherein the system information is broadcast system information to be broadcast in the cell to be reselected or is on-demand system information to be transmitted to the radio terminal in response to a request message from the radio terminal.

12. The radio terminal according to claim 8, wherein the at least one processor is configured to, in response to failing to confirm that the first network slice is available in the cell to be reselected, transmit second information indicating the first network slice to a base station of the cell to be reselected, during a procedure in which the radio terminal transitions from the second RRC state to the first RRC state in the cell to be reselected or thereafter.

13. The radio terminal according to claim 8, wherein the first RRC state is an RRC_CONNECTED state, the second RRC state is an RRC_INACTIVE state, and the third RRC state is an RRC_IDLE state.

14. A method for a base station placed in a Radio Access Network (RAN), the method comprising:

controlling state transitions of a first radio terminal among first to third RRC states, wherein the first RRC state is a state in which the first radio terminal and the RAN maintain an access stratum (AS) context and in which a location of the first radio terminal is known to the RAN at cell level, the second RRC state is a state in which the first radio terminal and the RAN maintain at least part of the AS context and in which the location of the first radio terminal is known to the RAN at RAN notification area level, the third RRC state is a state in which no RRC connection is established between the first radio terminal and the RAN, and wherein the method further comprises:

including, in the RAN notification area for the first radio terminal, only one or more cells in which a first network slice configured in the first radio terminal for data communication at least in the first RRC state is available; and configuring the RAN notification area in the first radio terminal.

\* \* \* \* \*